US010216188B2

(12) United States Patent
Brady et al.

(10) Patent No.: US 10,216,188 B2
(45) Date of Patent: Feb. 26, 2019

(54) AUTONOMOUS GROUND VEHICLES BASED AT DELIVERY LOCATIONS

(71) Applicant: Amazon Technologies, Inc., Seattle, WA (US)

(72) Inventors: Tye Michael Brady, Southborough, MA (US); Ethan Zane Evans, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 15/218,943

(22) Filed: Jul. 25, 2016

(65) Prior Publication Data

US 2018/0024554 A1    Jan. 25, 2018

(51) Int. Cl.
| | |
|---|---|
| *G05D 1/00* | (2006.01) |
| *G05D 1/02* | (2006.01) |
| *G06Q 10/08* | (2012.01) |
| *G06T 7/20* | (2017.01) |
| *G06Q 50/28* | (2012.01) |

(52) U.S. Cl.
CPC ......... *G05D 1/0088* (2013.01); *G05D 1/0276* (2013.01); *G06Q 10/08* (2013.01); *G06Q 10/0833* (2013.01); *G06Q 10/0837* (2013.01); *G06Q 50/28* (2013.01); *G06T 7/20* (2013.01); *G05D 2201/02* (2013.01)

(58) Field of Classification Search
USPC .................................................... 701/23–28
See application file for complete search history.

(56) References Cited

U.S. PATENT DOCUMENTS

| | | |
|---|---|---|
| 4,865,248 A | 9/1989 | Barth |
| 4,954,962 A | 9/1990 | Evans et al. |
| 5,040,116 A | 8/1991 | Evans et al. |
| (Continued) | | |

FOREIGN PATENT DOCUMENTS

| | | |
|---|---|---|
| DE | 102011086497 A1 | 5/2013 |
| FR | 2692064 A1 | 12/1993 |
| (Continued) | | |

OTHER PUBLICATIONS http://qz.com/613277/google-wants-to-deliver-packages-from-self-driving-trucks/.

(Continued)

*Primary Examiner* — Jonathan L Sample
(74) *Attorney, Agent, or Firm* — Athorus, PLLC

(57) ABSTRACT

Autonomous ground vehicles ("AGVs") are utilized to retrieve items from transportation vehicles (e.g., delivery trucks) for delivery to specified locations (e.g., user residences, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.).

20 Claims, 11 Drawing Sheets

(56) References Cited

U.S. PATENT DOCUMENTS

| | | |
|---|---|---|
| 5,386,462 A | 1/1995 | Schlamp |
| 5,995,898 A | 11/1999 | Tuttle |
| 6,266,577 B1* | 7/2001 | Popp ............... B25J 9/163 |
| | | 700/245 |
| 6,344,796 B1 | 2/2002 | Ogilvie et al. |
| 6,374,155 B1* | 4/2002 | Wallach ............. G06F 19/00 |
| | | 700/245 |
| 6,426,699 B1 | 7/2002 | Porter |
| 6,543,983 B1* | 4/2003 | Felder ................ B23Q 7/10 |
| | | 414/331.07 |
| 6,636,781 B1* | 10/2003 | Shen ................. B08B 9/045 |
| | | 318/568.11 |
| 6,690,997 B2 | 2/2004 | Rivalto |
| 6,694,217 B2 | 2/2004 | Bloom |
| 6,705,523 B1* | 3/2004 | Stamm ........... G05B 19/41895 |
| | | 235/383 |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,459,880 B1 | 12/2008 | Rosen |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,530 B1 | 5/2011 | Talmage |
| 7,966,093 B2* | 6/2011 | Zhuk ................ G05D 1/0088 |
| | | 700/245 |
| 8,015,023 B1 | 9/2011 | Lee et al. |
| 8,078,317 B2 | 12/2011 | Allinson et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,511,606 B1 | 8/2013 | Lutke et al. |
| 8,577,538 B2* | 11/2013 | Lenser ............... G05D 1/0274 |
| | | 701/2 |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,139,310 B1 | 9/2015 | Wang |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2* | 2/2016 | Im .................... G01S 5/0252 |
| 9,336,506 B2 | 5/2016 | Shucker et al. |
| 9,358,975 B1* | 6/2016 | Watts ................. B60W 30/04 |
| 9,373,149 B2* | 6/2016 | Abhyanker ........... G06Q 50/28 |
| 9,397,518 B1 | 7/2016 | Theobald |
| 9,411,337 B1 | 8/2016 | Theobald et al. |
| 9,436,926 B2 | 9/2016 | Cousins et al. |
| 9,489,490 B1 | 11/2016 | Theobald |
| 9,535,421 B1 | 1/2017 | Canoso et al. |
| 9,545,852 B2 | 1/2017 | Streett |
| 9,561,941 B1* | 2/2017 | Watts ................. B66F 9/063 |
| 9,582,950 B2 | 2/2017 | Shimizu et al. |
| 9,619,776 B1 | 4/2017 | Ford et al. |
| 9,623,553 B1 | 4/2017 | Theobald et al. |
| 9,623,562 B1* | 4/2017 | Watts ................. B25J 9/1689 |
| 9,682,481 B2* | 6/2017 | Lutz .................. B25J 9/1697 |
| 9,718,564 B1 | 8/2017 | Beckman et al. |
| 9,720,414 B1 | 8/2017 | Theobald |
| 9,733,646 B1* | 8/2017 | Nusser ................ B65G 1/137 |
| 9,746,852 B1* | 8/2017 | Watts ................. G01S 17/936 |
| 9,786,187 B1* | 10/2017 | Bar-Zeev ............. G08G 5/003 |
| 9,886,035 B1* | 2/2018 | Watts ................. G05D 1/0251 |
| 9,959,771 B1* | 5/2018 | Carlson ............... G08G 5/0039 |
| 9,959,773 B2* | 5/2018 | Raptopoulos ........ G08G 5/0069 |
| 10,022,753 B2* | 7/2018 | Chelian ................ B07C 5/362 |
| 10,022,867 B2* | 7/2018 | Saboo ................. G06Q 50/28 |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2003/0040980 A1 | 2/2003 | Nakajima et al. |
| 2003/0141411 A1 | 7/2003 | Pandya et al. |
| 2004/0068416 A1 | 4/2004 | Solomon |
| 2004/0162638 A1* | 8/2004 | Solomon ............... F41H 13/00 |
| | | 700/247 |
| 2006/0118162 A1 | 6/2006 | Saelzer et al. |
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1* | 10/2007 | Plishner ............... G05D 1/0295 |
| | | 701/23 |
| 2007/0293978 A1 | 12/2007 | Wurman et al. |
| 2008/0027591 A1* | 1/2008 | Lenser ................ G05D 1/0251 |
| | | 701/2 |
| 2008/0100258 A1 | 5/2008 | Ward |
| 2008/0150679 A1 | 6/2008 | Bloomfield |
| 2008/0154659 A1 | 6/2008 | Bettes et al. |
| 2008/0167817 A1* | 7/2008 | Hessler ............... G01C 21/005 |
| | | 701/514 |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0106124 A1 | 4/2009 | Yang |
| 2009/0149985 A1 | 6/2009 | Chirnomas |
| 2009/0236470 A1 | 9/2009 | Goossen et al. |
| 2009/0299903 A1 | 12/2009 | Hung et al. |
| 2009/0314883 A1 | 12/2009 | Ariton et al. |
| 2011/0035149 A1 | 2/2011 | McAndrew et al. |
| 2011/0264311 A1 | 10/2011 | Lee et al. |
| 2012/0039694 A1 | 2/2012 | Suzanne |
| 2012/0109419 A1 | 5/2012 | Mercado |
| 2012/0219397 A1 | 8/2012 | Baker |
| 2012/0323365 A1 | 12/2012 | Taylor et al. |
| 2013/0073477 A1 | 3/2013 | Grinberg |
| 2013/0081245 A1 | 4/2013 | Vavrina et al. |
| 2013/0126611 A1* | 5/2013 | Kangas ................ G07G 1/009 |
| | | 235/385 |
| 2013/0148123 A1 | 6/2013 | Hayashi |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2014/0022055 A1 | 1/2014 | Levien et al. |
| 2014/0030444 A1 | 1/2014 | Swaminathan et al. |
| 2014/0032034 A1* | 1/2014 | Raptopoulos ........ G08G 5/0069 |
| | | 701/25 |
| 2014/0052661 A1 | 2/2014 | Shakes et al. |
| 2014/0136282 A1 | 5/2014 | Fedele |
| 2014/0136414 A1 | 5/2014 | Abhyanker |
| 2014/0180914 A1 | 6/2014 | Abhyanker |
| 2014/0254896 A1 | 9/2014 | Zhou et al. |
| 2014/0325218 A1 | 10/2014 | Shimizu et al. |
| 2014/0330456 A1* | 11/2014 | Lopez Morales ............. |
| | | G06Q 10/08355 |
| | | 701/3 |
| 2015/0006005 A1* | 1/2015 | Yu .................... G06Q 10/08 |
| | | 701/22 |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yoffe |
| 2015/0153175 A1 | 6/2015 | Skaaksrud |
| 2015/0158599 A1 | 6/2015 | Sisko |

(56) References Cited

U.S. PATENT DOCUMENTS

| | | |
|---|---|---|
| 2015/0175276 A1 | 6/2015 | Koster |
| 2015/0183528 A1 | 7/2015 | Walsh et al. |
| 2015/0185034 A1 | 7/2015 | Abhyanker |
| 2015/0202770 A1* | 7/2015 | Patron .................. G05D 1/024 700/245 |
| 2015/0227882 A1* | 8/2015 | Bhatt .................. G06Q 10/083 705/330 |
| 2015/0246727 A1 | 9/2015 | Masticola et al. |
| 2015/0253777 A1 | 9/2015 | Binney et al. |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0370251 A1 | 12/2015 | Siegel et al. |
| 2016/0009413 A1 | 1/2016 | Lee et al. |
| 2016/0033966 A1 | 2/2016 | Farris et al. |
| 2016/0104099 A1 | 4/2016 | Villamar |
| 2016/0114488 A1 | 4/2016 | Medina et al. |
| 2016/0129592 A1* | 5/2016 | Saboo .................. G06Q 50/28 700/248 |
| 2016/0132059 A1* | 5/2016 | Mason .................. G05D 1/0246 701/28 |
| 2016/0144734 A1 | 5/2016 | Wang et al. |
| 2016/0144982 A1 | 5/2016 | Sugumaran |
| 2016/0200438 A1 | 7/2016 | Bokeno |
| 2016/0207627 A1 | 7/2016 | Hoareau et al. |
| 2016/0214717 A1 | 7/2016 | Silva |
| 2016/0235236 A1 | 8/2016 | Byers et al. |
| 2016/0257401 A1 | 9/2016 | Buchmueller et al. |
| 2016/0266578 A1 | 9/2016 | Douglas et al. |
| 2016/0282126 A1* | 9/2016 | Watts .................. G01C 21/206 |
| 2016/0299233 A1 | 10/2016 | Levien et al. |
| 2016/0334229 A1 | 11/2016 | Ross et al. |
| 2016/0364989 A1 | 12/2016 | Speasl et al. |
| 2017/0011333 A1* | 1/2017 | Greiner .................. G06Q 10/083 |
| 2017/0032315 A1 | 2/2017 | Gupta et al. |
| 2017/0087999 A1 | 3/2017 | Miller et al. |
| 2017/0096222 A1 | 4/2017 | Spinelli |
| 2017/0098378 A1 | 4/2017 | Soundararajan et al. |
| 2017/0100837 A1* | 4/2017 | Zevenbergen .......... B25J 5/00 |
| 2017/0101017 A1 | 4/2017 | Streett |
| 2017/0113352 A1* | 4/2017 | Lutz .................. B25J 9/1697 |
| 2017/0164319 A1 | 6/2017 | Skaaksrud et al. |
| 2017/0167881 A1 | 6/2017 | Rander et al. |
| 2017/0255896 A1* | 9/2017 | Van Dyke .......... G06Q 10/083 |
| 2017/0286905 A1 | 10/2017 | Richardson et al. |
| 2017/0308098 A1* | 10/2017 | Yu .................. G06Q 10/08 |

FOREIGN PATENT DOCUMENTS

| | | |
|---|---|---|
| JP | 2004126800 A | 4/2004 |
| JP | 2011211025 A | 10/2011 |
| WO | 2013148123 A1 | 10/2013 |
| WO | 2017064202 A1 | 4/2017 |

OTHER PUBLICATIONS http://www.geekwire.com/2016/google-pondering-drone-delivery-even-about-boxes-it-flies-to-front-doors/.

https://www.starship.xyz/.

International Search Report and Written Opinion for PCT Application No. PCT/US2017/043401 dated Sep. 19, 2017.

Kuckelhaus, M., Self-Driving Vehicles in Logistics, Dec. 2014, DHL Trend Research, Troisdorf, Germany.

Kais, Mikael et al., "An Intelligent architecture for automated transportation in our cities", 2001 European Control Conference (ECC), Porto, Portugal, Sep. 4-7, 2001, pp. 277-282 (Year: 2001).

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

* cited by examiner

AUTONOMOUS GROUND VEHICLES BASED AT DELIVERY LOCATIONS

BACKGROUND

Many companies, including "big box" retail and mail-order companies, package items (e.g., books, CDs, apparel, food, etc.) and/or groups of items together to be shipped in fulfillment of requests from customers (e.g., internal or external, retail or wholesale customers). Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier, such as the United States Postal Service, FedEx, or UPS. An agent of the shipping carrier will load the item onto a truck that is driven to the final delivery location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
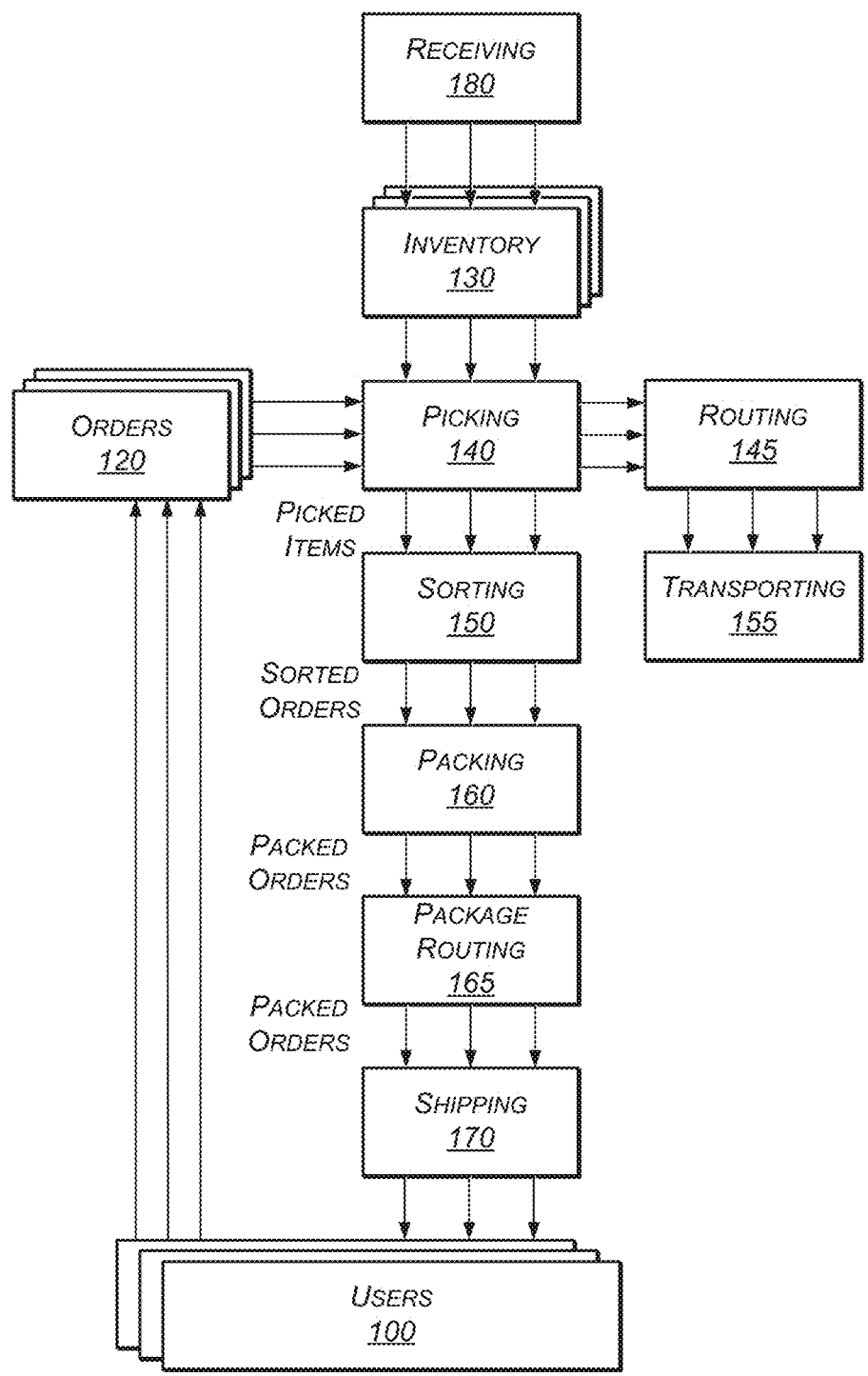
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes a system in which autonomous ground vehicles ("AGVs") are utilized to retrieve items from transportation vehicles (e.g., delivery trucks) for delivery to specified locations (e.g., user's residences). In various implementations, the AGVs may be owned by individual users and/or may service a group of users in a given area (e.g., in an apartment building, neighborhood, etc.). In various implementations, AGVs may be stationed at various types of locations (e.g., inside or outside of user residences, common areas, etc.) and may travel out (e.g., to a street) to meet a transportation vehicle (e.g., a delivery truck) that is carrying items. For example, a notification may be received indicating that a transportation vehicle is expected to arrive at a designated meeting location (e.g., on a street) at a particular time. As another example, various types of sensors (e.g., image sensors, sound sensors, etc.) may be utilized to determine when a transportation vehicle is approaching an area (e.g., an ice cream truck may play a sound when approaching, etc.). In response to an approaching transportation vehicle, one or more AGVs may travel out to the meeting location to receive items from the transportation vehicle. In one configuration, a starting travel time may be established for an AGV to begin travel toward the meeting location so that the AGV may arrive ahead of the transportation vehicle. The determination of the starting travel time may be based at least in part on an estimated time of when the transportation vehicle is expected to arrive at the meeting location.

In various implementations, AGVs may have various capabilities for navigating to and from transportation vehicles, delivery locations, etc. For example, an AGV may include various sensors and devices (e.g., imaging sensors, proximity sensors, GPS capabilities, etc.) to assist with navigation. In various implementations, an AGV may also include one or more access mechanisms to assist with opening access barriers (e.g., doors, gates, etc.) that the AGV may encounter on a travel path (e.g., on the way to a meeting location, delivery location, etc.). For example, an access mechanism may include a transmitter device that transmits a garage door opener signal to allow the AGV to open and close a garage door for exiting and/or entering a garage. As another example, a specialized door (e.g., sized to fit the AGV) may include a locking and/or opening mechanism that is triggered by an access mechanism of the AGV. In accordance with such access techniques and other capabilities of AGVs, it will be appreciated that an item may be received and delivered by an AGV without requiring a user to be home. In addition, an AGV may receive and deliver an item when a user is busy or otherwise unavailable (e.g., when a user is on a phone call, sleeping, etc.). Items may also be received and delivered by AGVs at times that may be more conducive for deliveries (e.g., between 2:00 a.m. and 6:00 a.m., etc.).

In various implementations, when a group of AGVs is congregating at a meeting location for meeting a transportation vehicle, the positions of the AGVs may be coordinated so that the AGVs are in a designated order at the meeting location. For example, when an AGV is at a meeting location, if another AGV is determined to be present (e.g., utilizing various sensors of the AGVs and/or as indicated by a central management system, etc.), one or both of the AGVs may be instructed to move relative to the other according to a designated order. In various implementations, the designated order may be determined according to various organizational methods. For example, the AGVs may be arranged to be lined up in an order according to the delivery addresses where the AGVs will be delivering items. As another example, the AGVs may be arranged in an order according to an arranged order of items that are stored in a transportation vehicle. It will be appreciated that such arrangements of AGVs at the meeting location may simplify the transfer of items from the transportation vehicle to the AGVs. In various implementations, the AGVs may also include markings or other identifying symbols or devices (e.g., flashing lights, sounds, etc.) for simplifying the identification and transfer of corresponding items from the transportation vehicle.

In various implementations, after an item from a transportation vehicle is placed in a storage compartment of an AGV, the storage compartment may be locked while the AGV travels to a delivery location (e.g., at a user's residence). At the delivery location, a user may interact with a user interface of the AGV, or an access code or signal may otherwise be provided, to unlock the storage compartment. In a configuration where an AGV has multiple storage compartments for delivering multiple orders, a separate access code or other mechanism may be utilized for each of the storage compartments, so that each user may only access or otherwise receive the item(s) that are part of their order. In certain implementations, an AGV with multiple storage compartments may also receive items from multiple transportation vehicles or other sources (e.g., wherein the items are locked in different storage compartments), before the AGV delivers the items to one or more delivery locations.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a user's residence, a place of business, any location where a user or inventory is located, etc. Inventory or items may be any physical goods that can be transported using an AGV.

A block diagram of a materials handling facility which, in one implementation, may be an order fulfillment facility configured to utilize various systems and methods described herein (e.g., with regard to utilization of transportation vehicles and AGVs for delivering items, etc.), is illustrated in FIG. 1. In this example, multiple users 100 may submit orders 120, where each order 120 specifies one or more items from inventory 130 to be shipped or otherwise delivered (e.g., by a transportation vehicle and AGV) to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a transportation vehicle has been designated for a delivery to a meeting location with one or more AGVs, the item(s) of one or more shipment sets may be picked at the picking operation 140 directly into storage areas (e.g., bins) of the transportation vehicle. In various implementations, the item(s) in a particular storage area may be designated for further transport by a particular AGV, as will be described in more detail below with respect to FIGS. 3 and 4. More specifically, once the transportation vehicle reaches a designated meeting location, the item(s) in a particular storage area (e.g., wherein the storage area corresponds to a particular user order) may be transferred to or otherwise acquired by a particular AGV for delivering the items to a delivery location (e.g., at a user's residence, etc.). In some implementations, the storage areas of the transportation vehicle may be permanently affixed within the transportation vehicle. In other implementations, the transportation vehicle may include removable components that may be filled with items in the materials handling facility and then placed in the transportation vehicle. For example, a storage area of a transportation vehicle may include a bay of bins, which may remain in the transportation vehicle or may be removed and filled with items inside a materials handling facility, after which the bay of bins may be moved back into the transportation vehicle for transport. Regardless of whether the storage areas of the transportation vehicle are fixed or removable, it will be appreciated that by picking items directly into the storage areas of the transportation vehicle, and then further transporting the items with AGVs, the items may not need to be packed in shipping packages. In addition, the packing slip typically included in a shipping package may be applied to the item (e.g., stickered to the item), printed out at the transportation vehicle and/or AGV upon retrieval of the item, or otherwise made available to a user.

In various implementations, the storage areas of the transportation vehicle may each include a unique identifier, such as a bar code, QR code, unique number, etc., to enable tracking, identification, and/or association of items placed in each of the storage areas. For example, during a picking operation, an agent or automated system (e.g., robotic) within the materials handling facility may scan the bar code of the storage area and/or scan a bar code or identifier of the picked item as the item is picked and/or placed into the storage area. Scanning of the storage area and/or the picked item may be utilized to associate and track the item with the storage area and the transportation vehicle. As storage areas of transportation vehicles are filled, a routing operation 145 may route the filled storage areas and/or transportation vehicles to an appropriate transporting operation 155 from which the transportation vehicle may travel to a designated meeting location for meeting with AGVs, as will be described in more detail below with respect to FIGS. 3 and 4.

In other examples, a transportation vehicle (e.g., a truck) may be made to hold or otherwise transport one or more delivery containers, in which case the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc., to enable tracking and identification of the delivery container and association of items placed into the delivery container. For example, during a picking operation, an agent within the materials handling facility may scan the bar code of the delivery container and scan a bar code or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the transportation vehicle to be transported with the item when it is delivered by an AGV, or otherwise made available to a user.

Regardless of the type of delivery container utilized, in some implementations, some types of items can be transported in the delivery container without needing to be packed in a shipping package inside the delivery container. In other instances, items that are either pre-packaged, fragile, or need additional protection prior to transport may be picked and packed in a shipping package. In another implementation, items may be put into bags prior to placement in the delivery container and/or storage areas to provide confidentiality of the ordered items. In addition, items from multiple shipment sets to be transported by the same transportation vehicle may be picked into the same delivery container for transport. As delivery containers are filled, a routing operation 145 may route the filled delivery containers to the appropriate transporting operation 155 for placement in a designated transportation vehicle. The routing operation 145 may be manual or automated. The routing operation 145 may receive an indication of the transportation vehicle to which each item should be routed from a shipment planning system and route delivery containers to one of two or more transporting operations 155, from which they may be placed in a designated transportation vehicle.

In other examples, some picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. In various implementations, transportation vehicles may be utilized for the shipping and may be considered as an alternative to shipping by traditional carriers. The package routing operation 165 may, depending on the specific implementation, be either automated or manual. The package routing operation 165 may receive an indication of the destination to which each packed shipment set should be routed from a central control system. In some instances, the destination may be the final destination identified by the user, or a destination at which transfer of a shipment set may occur for final delivery to the user, or a meeting location from which one or more AGVs may complete the final delivery. The package routing operation 165 may also determine a routing destination for each packed shipment set dependent on the size of a shipping package in which the shipment set is contained and/or based on whether the shipment set will be delivered by a traditional carrier, a transportation vehicle, and/or an AGV.

The arrangement and order of operations illustrated by FIG. 1 is merely one example of many possible implementations of the operation of a materials handling facility, such as an order fulfillment facility, that enables filling of storage areas of transportation vehicles with items and subsequent travel to meeting locations for further transport by AGVs (FIGS. 3 and 4) and/or other fulfillment of user orders. Other types of materials handling, manufacturing, or order fulfillment facilities may include different, fewer, or additional operations and resources, according to different implementations.

Figure 2A:
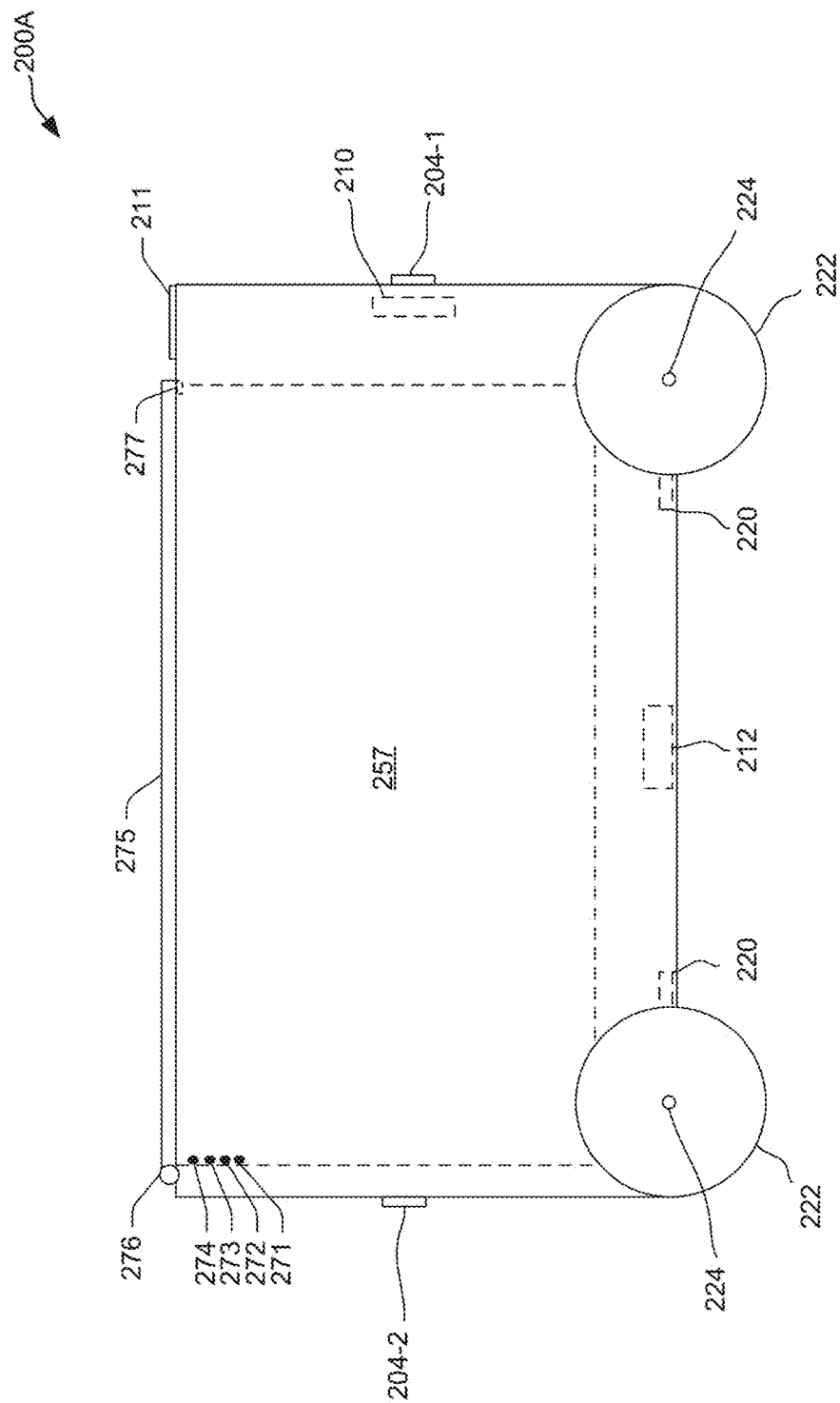
FIG. 2A depicts a block diagram of a side view of an autonomous ground vehicle, according to an implementation.

FIG. 2A depicts a block diagram of a side view of an AGV 200A, according to an implementation. In the example of FIG. 2A, the AGV 200A includes four wheels 222 which are mounted on axles 224 that may be rotated by one or more motors 220. In other implementations, additional or fewer motors 220 and/or wheels 222 may be included in the AGV 200A. The size of the AGV 200A may vary and, for purposes of illustration with respect to the example of FIG. 2A, may include a storage compartment 257 which may hold items that are transported by the AGV 200A. In various implementations, the storage compartment 257 may be divided into smaller storage compartments (e.g., storage compartments 257A and 257B, as will be described in more detail below with respect to FIG. 2B).

In various implementations, varying numbers and/or sizes of storage compartments, and/or additional features may be included depending on the specific implementation. The shape of the AGV 200A may also vary, depending on the implementation. For example, the AGV may be sized and shaped to be drivable on a standard sidewalk or road, and to fit within a doorway or other access point (e.g., of a user's residence, etc.). The storage compartment 257 may be sized according to various factors (e.g., to match the size of a standard bin of a materials handling facility, wherein similar sized bins may also be used on the transportation vehicles that bring the items to the AGVs, as well as in the materials handling facilities that the items are transported from, etc.). In various implementations, the utilization of standard sized and configured bins (e.g., with a scanning code in a standard location, etc.) may simplify the transfers and processing of items. For example, ordered items that are placed in a standard sized bin at a materials handling facility may be easily transported by a transportation vehicle and/or AGV that is configured for transporting and processing the standard sized bin, resulting in greater efficiencies throughout the overall transportation process. In various implementations, weatherproofing techniques may be utilized to protect the functionality of the AGV 200A and any operational components (e.g., storage compartments, control panels, etc.) when the AGV is subjected to weather conditions during travel and/or other operations. The AGV 200A further includes an AGV control system 210, which as discussed in further detail below with respect to FIG. 9, may control the operation, routing, navigation, communication, object sense and avoid, item engagement mechanism, etc. of the AGV 200A.

As shown in FIG. 2A, various sensors 204 may be mounted to the AGV 200A. For example, sensors 204-1 and 204-2 may be mounted on the front and back of the AGV 200A, respectively. The sensors 204 may be of various types. In general, certain sensors 204 may be utilized to assist with the navigation, object sense and avoid, etc. of the AGV. For example, the sensors 204-1 and/or 204-2 may include imaging sensors and/or distance detection sensors for measuring and monitoring the distance between the AGV 200A and other objects (e.g., an obstacle, a roadway, another AGV, etc.). While the example illustrated in FIG. 2A includes two sensors 204 mounted to the AGV 200A, in other implementations, fewer or additional sensors may be utilized. In one implementation, each of the sensors 204-1 and 204-2 may be representative of an array of sensors that are utilized to assist with the various functions of the AGV 200A.

The AGV 200A also includes one or more power modules 212. In this example, the AGV 200A includes a power module 212 that is removably mounted at the bottom of the AGV 200A. The power module 212 for the AGV may be in the form of battery power, solar power, gas power, super capacitor, fuel cell, alternative power generation source, or a combination thereof. The power module 212 is coupled to and provides power for the AGV control system 210 and the motor(s) 220 of the propulsion system, as well as any other attached input/output devices, etc. The power module 212 stores energy with a corresponding energy level. In various implementations, the stored energy level of the power module 212 may be recharged through various techniques. For example, as will be described in more detail below with respect to FIGS. 3 and 4, when an AGV is at a home base location or other location, the AGV may engage with a charging component that will recharge the power module. As another example, an AGV may also or alternatively utilize other techniques for recharging (e.g., utilizing sunlight to recharge through solar panels, etc.). In addition, in some implementations, a power module may be configured such that it can be autonomously removed and/or replaced with another power module while the AGV is at a home base location or other location.

In various implementations, the AGV 200A may also include an item engagement mechanism (not shown). For example, the item engagement mechanism may include a robotic arm or other mechanism that may be utilized to engage an item for placement in a storage compartment 257 of the AGV 200A, or for removing an item from a storage compartment 257 when the item is being delivered to a delivery location. The item engagement mechanism may communicate with (via wired or wireless communication) and be controlled by the AGV control system 210. In various implementations, such item engagement mechanisms may also or alternatively be included in a transportation vehicle, home base location, meeting location, user's residence, etc. for placing items in and/or removing items from a storage compartment 257 of the AGV 200A.

Figure 3:
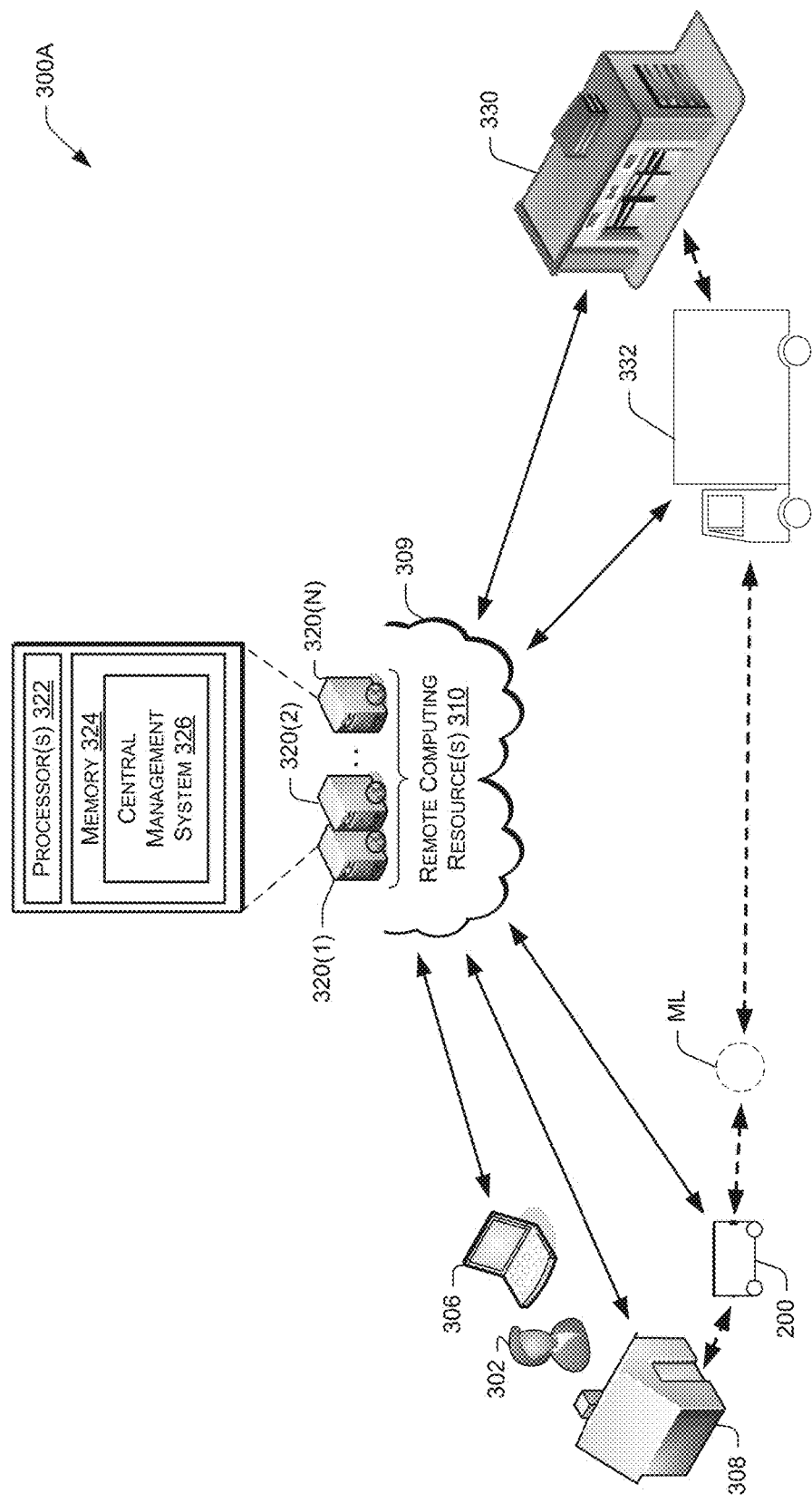
FIG. 3 depicts a block diagram of an autonomous ground vehicle environment, according to some implementations.

The AGV control system 210 maintains information as to whether a storage compartment of the AGV 200A is empty or includes items, the access code(s) or other identifier(s) necessary to open the storage compartment and any other information necessary to maintain the AGV. The AGV control system 210 may also lock/unlock storage compartments, activate sensors, and the like. The AGV 200A may be configured to obtain information from a remote computing resource or may be configured to operate primarily as a stand-alone unit, with limited external communication to receive/provide order/delivery/transfer information. FIG. 3, described below, illustrates an example of an environment in which a central management system 326 is provided for remotely communicating with an AGV 200A as part of a system for transporting items. The AGV control system 210 may include a component configured to provide wired and/or wireless network connectivity (e.g., with computing resources in a user device, remote computing resources, etc.). Wireless connectivity may be implemented using a wireless antenna (not shown), which may provide both receive and transmit functionality.

The AGV 200A may also include a user interface 211. The user interface 211 is configured to receive and provide information to a user of the AGV 200A and may include, but is not limited to, a display, such as a touch-screen display, a scanner, a keypad, a biometric scanner, an audio transducer, one or more speakers, one or more image capture sensors, such as a video camera, and any other types of input or output devices that may support interaction between the AGV 200A and a user. In various implementations, the user interface 211 may alternatively include more limited features. For example, in one implementation the user interface 211 may only include a relatively small display and/or a keypad for providing input. In certain other implementations, these and other features may also be eliminated, wherein control of the AGV 200A may primarily be provided remotely. For example, in order to access a storage compartment, a user may send or reply to a text message to or from a centralized remotely located control system (e.g., a central management system), which controls the AGV 200A to open the storage compartment door so that the user can retrieve an ordered item. In various implementations, the AGV 200A may have capabilities for directly receiving such signals from a user device or other device (e.g., a device inside a user's residence) that provides a signal to open the storage compartment door.

In the example of FIG. 2A, the storage compartment 257 of the AGV 200A includes bottom and side surfaces and a door 275 configured to form a cavity in which items may be stored. In addition, the storage compartment 257 may include various security or other components. For example, the storage compartment 257 may include a locking mechanism 277, which may be controlled directly or remotely by the AGV control system 210. The storage compartment 257 may also include a presence detection sensor 271, a motion sensor 272, an image capture sensor 273, a temperature sensor 274 and/or other sensors.

In various implementations, the locking mechanism 277 may be controlled by the AGV control system 210, either through wired or wireless communication, to effect locking and unlocking of a door 275 of a storage compartment 257. For example, when a user, carrier, etc. interacts with the user interface 211 (e.g., via the display, or with a user device, etc.) and provides an access code or other identifier, the AGV control system 210 may unlock the storage compartment 257. In a configuration in which the locking mechanism 277 includes a pin holding the door closed, the AGV control system 210 may activate the locking mechanism 277 such that the pin retracts, thereby disengaging the lock of the storage compartment 257 allowing the door 275 as mounted on a hinge 276 to open. In some implementations, the storage compartment 257 may also include a spring mechanism (not shown) such that when the locking mechanism 277 is disengaged, the spring mechanism propels the door 275 outward, thereby identifying to a user, carrier, etc. that the door 275 is unlocked and the storage compartment 257 is accessible.

In addition to the use of retractable pins, any mechanical, magnetic, electrical or other form of locking mechanism may be utilized with the various implementations described herein. In addition, the storage compartment 257 may also include magnets to help close a door. Moreover, while the above example describes the AGV control system 210 controlling the locking mechanism, in other implementations, the storage compartment may also or alternatively be controlled and/or communicated with directly by a command component and/or remote computing resources, etc.

The presence detection sensor 271 may be used to detect the presence or absence of objects in the storage compartment 257, and the motion sensor 272 may be used to detect movement in the storage compartment 257. For example, the presence detection sensor 271 may be utilized when an agent, carrier, user, or automated system (e.g., robotic) is placing items, delivery containers and/or transfer containers in the storage compartment 257 to confirm that the item is indeed in the storage compartment 257 before the door 275 is closed and locked by the locking mechanism 277. Additionally, the presence detection sensor 271 and/or motion sensor 272 may also be used when a user is retrieving an item stored in the storage compartment 257 or when a carrier is adding or removing an item, delivery container and/or transfer container from the storage compartment 257. For example, when a user interacts with the user interface 211 or an access code is otherwise provided such that a storage compartment 257 is opened, the presence detection sensor 271 and/or motion sensor 272 may be used to confirm that a user has reached into the storage compartment 257 and removed its contents (or added items in the case of returns). In some implementations, there may be multiple presence detection sensors 271 and/or motion sensors 272 distributed throughout the inside of a storage compartment to ensure objects/motion is detected.

The storage compartment 257 may also include an image capture sensor 273, such as a camera, and optionally an illumination component (not shown), such as a light emitting diode (LED), that may be used to illuminate the inside of the storage compartment 257. The image capture sensor 273 may also be used to capture images or and/or detect the presence or absence of items within the storage compartment 257. For example, the image capture sensor 273 may be used to capture images to identify the type of object located within the storage compartment 257 and/or to identify or record video/images of access within the storage compartment 257. In various implementations, the sensor 273 and/or a separate item identification sensor may include a bar code scanner or other technology that is utilized to determine an identification of an item that is being placed, or has been placed, in the storage compartment 257. For example, a sensor including a bar code scanner or other identification technology may be located with or as part of the other sensors 271-274, on the door 275, as part of the user interface 211, or otherwise positioned so as to scan or otherwise identify an item as it is being placed or is otherwise within the storage compartment 257. Such identification and/or images, video etc. may be recorded by the system and/or transmitted (e.g., to a central management system as will be described in more detail below with respect to FIG. 3) and/or may be provided to a user to identify what items have been placed in a storage compartment for delivery. For example, a user may wish to receive a message and/or image indicating what items are being delivered.

Some storage compartments 257 may be refrigerated storage compartments. In various implementations, such refrigerated storage compartments may include their own cooling mechanisms and/or the AGV 200A may have a centralized cooling system. The temperature of previously non-refrigerated storage compartments may be adjusted to become refrigerated storage compartments, and vice versa. In an implementation with multiple refrigerated storage compartments, the temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in refrigerated storage compartments.

In various implementations, the temperatures in the refrigerated storage compartments may be adjusted when items are to be placed into the refrigerated storage compartments, or may be adjusted in advance. For example, when a refrigerated item is scheduled to be placed into a refrigerated storage compartment of an AGV, the temperature of the refrigerated storage compartment may be adjusted to a temperature that is specified for the refrigerated item in advance so that the refrigerated storage compartment will already be at the specified temperature when the item is placed into the refrigerated storage compartment. In one implementation, the image capture sensor 273 may be used to capture an image of an item when it is placed into a storage compartment in order to try to determine an appropriate storage temperature for the item. For example, an item may have information on a label which identifies a storage temperature, such as "contents to be stored at 32 degrees F. or lower."

The temperatures in some or all of the refrigerated storage compartments may be controlled by the AGV control system 210. Continuous monitoring and regulating of the temperatures of the refrigerated storage compartments in which such items are kept may be important for verifying the condition of the items. Temperature sensors, such as the temperature sensor 274 of the storage compartment 257, may be utilized for sensing the temperature for monitoring and regulating the temperature inside the refrigerated storage compartment. The refrigerated storage compartment and/or the entire AGV 200A may be insulated to prevent the dissipation of the cooled air from the refrigerated storage compartment.

In various implementations, a refrigerated storage compartment may be an insulated storage compartment which is cooled by passive cooling elements that are placed within the storage compartment. For example, rather than utilizing an active cooling system which may have components such as compressors and coils, the storage compartment may be cooled by passive cooling elements such as cold packs, frozen water bottles, etc. In one implementation, the passive cooling elements may be added to the storage compartment when the item is first placed into the storage compartment, such as at a meeting location. In another implementation, the passive cooling elements may be included in a shipping container with an item at a materials handling facility when it is shipped to be delivered by an AGV. In an alternative implementation, the passive cooling elements may be added to the insulated storage compartment with the item when it arrives or is otherwise placed in the storage compartment.

In various implementations, the number of passive cooling elements to be included with an item may be calculated based on a number of factors. For example, one factor may be an estimated maximum period of time that the item may remain in the storage compartment before it is retrieved by a user. Another factor may be the expected ambient temperature at the AGV and/or during transport to the meeting location with the AGV. Other factors may include the size of the storage compartment, the size and number of items to be included in the storage compartment, etc. Various government regulations may also specify temperatures at which certain items are to be maintained. For example, various federal, state and/or municipal regulations may dictate requirements for storage temperatures for items as well as maximum periods of time that items may be stored at a given temperature. All of these factors may be included in a calculation of how many passive cooling elements should be included in an insulated storage compartment with an item, as well as a determination of a maximum period of time that the item may remain in the storage compartment.

In various implementations, the AGV 200A may also include a locator device (not shown) that is configured to assist with finding the AGV (e.g., when a transportation vehicle is searching for an AGV which is to receive an item, when a user is wanting an update on the location of an AGV that is delivering an item, etc.). For example, the locator device may wirelessly transmit an electronic signal that enables the position of the AGV to be tracked and/or otherwise determined (e.g., as indicated on a screen of a mobile electronic device, etc.). As another example, the locator device may emit various sounds, activate lights, etc. (e.g., to assist a carrier who is delivering items to multiple AGVs to determine which AGV is the correct AGV for a current item). In various implementations, the locator device may be controlled by the AGV control system 210 and/or a central management system (FIG. 3), etc. In various implementations, the AGV 200A may also include an RFID tag, a printed circuit board, or any other object or mechanism that may be detectable and used to identify the AGV 200A for security or other purposes (e.g., by a transportation vehicle, at an access point into a user's residence, etc.).

Figure 2B:
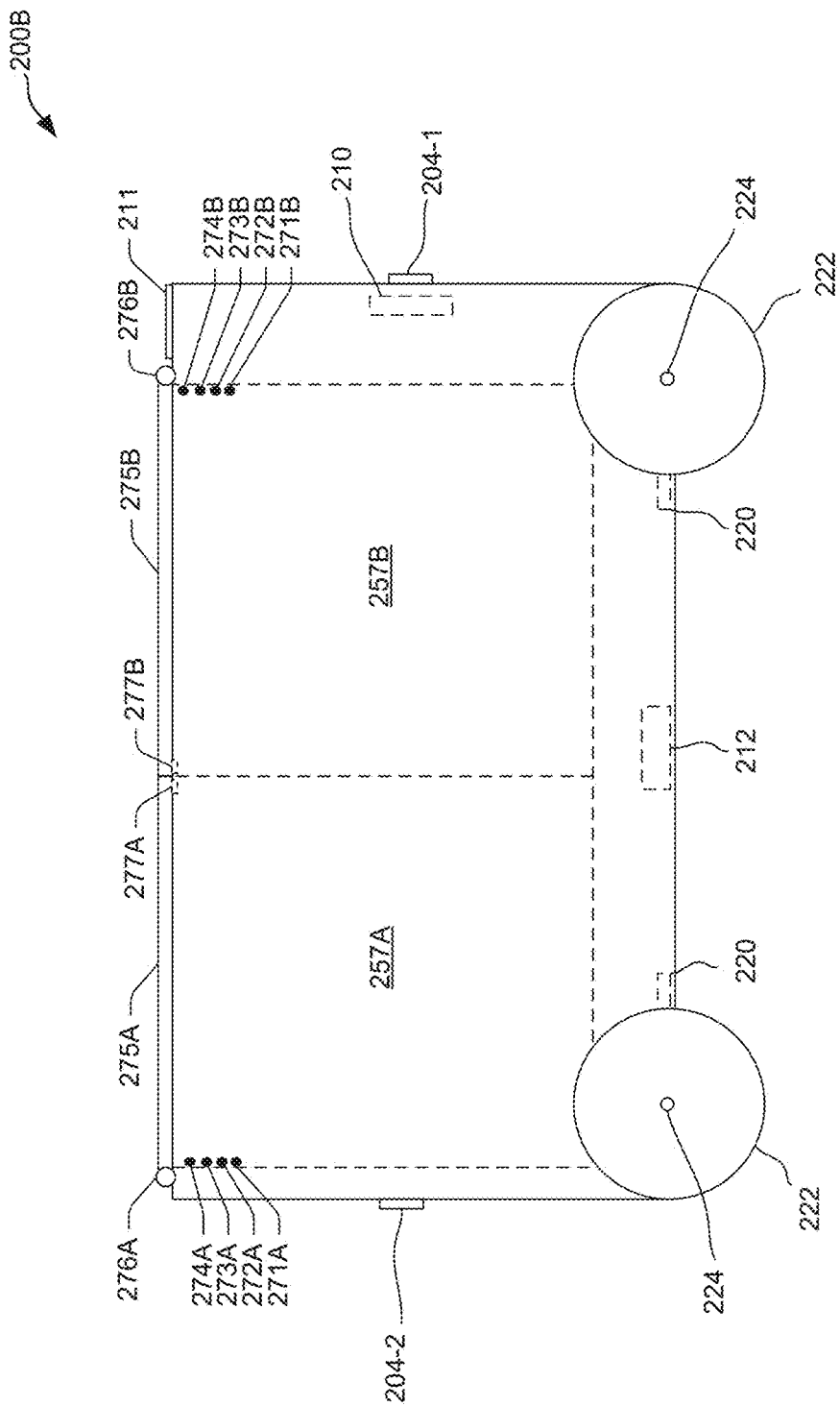
FIG. 2B depicts another block diagram of a side view of an autonomous ground vehicle, according to an implementation.

FIG. 2B depicts another block diagram of a side view of an AGV 200B, according to an implementation. The AGV 200B of FIG. 2B is similar to the AGV 200A of FIG. 2A, except in the AGV 200B the storage compartment 257 has been divided into storage compartments 257A and 257B.

The components of the storage compartments 257A and 257B are similar to those of the storage compartment 257, and will be understood to operate similarly, except as otherwise described below. More specifically, the storage compartments 257A and 257B each include respective doors 275A and 275B on hinges 276A and 276B, as well as respective locking mechanisms 277A and 277B. The storage compartments 257A and 257B also each include respective sets of sensors 271A-274A and 271B-274B.

In various implementations, the two storage compartments 257A and 257B may allow the AGV 200B to securely transport different items for different user orders and/or to have a separate storage compartment for different environmental or other needs (e.g., one of the storage compartments may be refrigerated, etc.). For example, an AGV may receive items from a transportation vehicle that are to be delivered to two different delivery locations as separately stored in the storage compartments 257A and 257B. In such a configuration, the AGV may travel to a first delivery location to deliver the item(s) that are stored in the storage compartment 257A, and then travel to a second delivery location to deliver the item(s) that are stored in the storage compartment 257B. A separate access code or other mechanism may be utilized for opening each of the storage compartments, so that each user may only access or otherwise receive the item(s) that are part of their delivery As another example, an AGV may receive items from two different transportation vehicles or other sources, wherein the item(s) from one source may be stored in the storage compartment 257A while the item(s) from another source may be stored in the storage compartment 257B, before the AGV delivers the multiple items to one or more delivery locations.

In various implementations, a transfer mechanism (e.g., an automated mechanism including rollers, a robotic arm, etc.) may also be included that allows items to be transferred from one storage compartment to another. For example, a partition between the storage compartments 257A and 257B may be movable and/or may otherwise have an access point or other mechanism to enable a transfer mechanism to move an item from storage compartment 257A to storage compartment 257B, or vice versa. In various implementations, items may be moved between storage compartments for various purposes. For example, if the AGV includes multiple items in the storage compartment 257A that are to be delivered to different locations, a transfer mechanism may be utilized to move the corresponding items for a respective delivery to the storage compartment 257B (e.g., wherein the user at the delivery location will only be given access to the storage compartment 257B that contains the ordered items). As another example, the AGV may receive items from multiple different transportation vehicles or other sources, wherein the item(s) from each source may initially be placed in the empty storage compartment 257B before being moved by a transfer mechanism to be secured within the storage compartment 257A before additional items are received from another source in the storage compartment 257B. In such a configuration, if the items are all being delivered to a single delivery location, access to the storage compartment 257A may be provided at the delivery location. Alternatively, if the items are being delivered to multiple delivery locations, for each respective delivery the transfer mechanism may be utilized to move the corresponding items for the respective delivery to the storage compartment 257B, as described above.

In various implementations, a transfer mechanism may also be utilized for transferring items between AGVs. For example, doors or panels in the sides, etc. of the AGVs may be movable and/or may otherwise have an access point or other mechanism to enable a transfer mechanism to move an item from one AGV to another (e.g., as the AGVs have moved to be adjacent to one another, etc.). In various implementations, items may be transferred between AGVs for various purposes. For example, if a first user wishes to provide an item to a second user (e.g., without requiring human interaction for the transfer), the first user's AGV that contains the item may be designated as a transportation vehicle and may travel to meet the second user's AGV at a meeting location where the item will be transferred to the second user's AGV for subsequent delivery to the second user. As another example, if an item is to be transported over a long distance, a first AGV that contains the item may be designated as a transportation vehicle and may travel for a first distance to meet a second AGV at a meeting location where the item will be transferred to the second AGV for subsequent transport for a second distance, etc.

In various implementations, AGVs may be utilized for different types of transactions (e.g., as facilitated by the central management system 326, etc.). For example, if a user at a location 308-1 wishes to advertise and sell an item to a user who is at a location 308-2, an AGV (e.g., AGV 200-1 and/or AGV 200-2) may be utilized to transport the item from the location 308-1 to the location 308-2 (e.g., without requiring any direct human contact or interaction). As another example, a location 308-1 may be a business (e.g., a corner grocery store, a restaurant, an office supply store, etc.) for which an AGV (e.g., AGV 200-1 and/or AGV 200-2) may be utilized to deliver an item from the location 308-1 to a location 308-2 (e.g., which may be a user's residence, another business, etc.).

FIG. 3 is a block diagram of an illustrative AGV environment 300 that enables a user 302 to order an item that will be transported by an AGV 200 to a delivery location 308. As will be described in more detail below, once a transportation vehicle 332 reaches a meeting location ML, an AGV 200 (e.g., which may have travelled to the meeting location ML from a home base location at a user's residence 308) may transport the item from the meeting location ML to a user specified delivery location 308 (e.g., back to the user's residence, etc.). In one configuration, the home base location (e.g., at the user residence) and/or the meeting location ML may include charging components and/or servicing areas for the AGV 200.

The AGV environment 300 includes a user interface that allows a user 302 to place an order for an item that will be transported by an AGV 200 to a delivery location. The user interface may be a graphical user interface, an audio only interface, a multi-mode interface, or any other interface for interacting with the user 302. The user interface may be provided to the user 302 through any type of electronic device 306, such as a tablet, desktop, laptop, smart phone, personal digital assistant, netbook, etc. The user interface may be delivered to the electronic device 306 by one or more remote computing resources 310 that make up part or all of an electronic commerce shopping environment. In other embodiments, the user interface may be in direct communication between a user and an agent.

The remote computing resources 310 may form a portion of a network-accessible computing platform implemented as a computing infrastructure of processors, storage, software, data access, and other components that is maintained and accessible via a network 309. Services, such as e-commerce shopping services, offered by the remote computing resources 310 do not require that the user have knowledge of the physical location and configuration of the system that delivers the services. The electronic device 306 may communicatively couple to the remote computing resources 310 via the network 309 which may represent wired technologies (e.g., wires, USB, fiber optic cable, etc.), wireless technologies (e.g., RF, cellular, satellite, Bluetooth, etc.), and/or other connection technologies. The network 309 carries data between the electronic device 306 and the remote computing resources 310.

After receiving from a user 302 an order for an item that may be transported by an AGV 200 to a delivery location, the electronic device 306 may send this information to the remote computing resources 310 over the network 309. As illustrated, the remote computing resources 310 may include one or more servers, such as servers 320(1), 320(2), . . . , 320(N). These servers 320(1)-(N) may be arranged in any number of ways, such as server farms, stacks, and the like that are commonly used in data centers. Furthermore, the servers 320(1)-(N) may include one or more processors 322 and memory 324 that may store a central management system 326.

The central management system 326 may be configured, for example, to perform order planning and filling of transportation vehicles 332 with orders (e.g., at a materials handling facility 330) for transport to meeting locations where AGVs may be met for further transporting the items to user specified delivery locations. In fulfilling orders that may be transported by an AGV, the materials handling facility 330 may fulfill orders using any of the processes discussed above with respect to FIG. 1. The transportation vehicles 332 and/or AGVs 200 may communicatively couple to the remote computing resources 310 via the network 309. For example, the communications to and from the transportation vehicles 332 and/or AGVs 200 may utilize wireless antennas of the transportation vehicles and AGVs.

The central management system 326 may also be configured, for example, to communicate with the transportation vehicles 332 and/or AGVs 200. In various implementations, the general activities of transportation vehicles and AGVs, including those related to the planning and implementation of the transportation vehicles receiving and transporting items and travelling to the designated meeting locations, and the acquiring and transport of items from the meeting locations to delivery locations by the AGVs, may be coordinated and/or otherwise controlled by the central management system 326. For example, the central management system 326 may receive or determine schedule data for the travel of the transportation vehicles to the designated meeting locations (e.g., as will be described in more detail below with respect to FIG. 6) and for the travel of the AGVs to and from the meeting locations (e.g., as will be described in more detail below with respect to FIGS. 7 and 8) and/or may otherwise direct the travel and/or the distribution and/or receiving of items by transportation vehicles and/or AGVs. As an example, instructions may be transmitted to an AGV 200 that indicate a meeting location ML where a transportation vehicle 326 may be met by the AGV 200 for acquiring an item that is to be delivered to a delivery location 308 (e.g., at a user's residence which may also correspond to a home base location for the AGV 200, etc.).

In various implementations, an AGV 200 may be configured to communicate with other AGVs 200, the central management system 326, etc. regarding various types of data and/or information. For example, an AGV 200 may sense and/or receive travel related data (e.g., related to travel conditions, obstacles, etc. for travelling along a travel path). In various implementations, travel related data that is sensed and/or collected by an AGV may be shared with a central management system, other AGVs, other vehicles, and/or other entities. The AGVs may also use this information locally, in combination with other received travel related data (e.g., for navigating current travel paths, etc.). Such travel related data may be centrally stored and/or otherwise processed to be utilized for creating and/or updating travel maps, informing other AGVs regarding the availability and/or conditions of certain travel paths, etc.

In various implementations, the remote computing resources 310 and/or central management system 326 may also receive tracking data (e.g., GPS) regarding the coordinates of the transportation vehicles and/or AGVs. The GPS data may be utilized for various purposes, such as answering location status requests or for sending notifications regarding the current locations of the transportation vehicles and/or AGVs. For example, a user may request that a notification be sent when a transportation vehicle or an AGV with an ordered item is approaching. As another example, a notification may be sent to an AGV when a transportation vehicle is on the way to or otherwise approaching a meeting location where the AGV is to meet the transportation vehicle for acquiring an identified item from the transportation vehicle. Notifications may also be sent from the transportation vehicle 332 and/or AGV 200 to the remote computing resources 310 and/or central management system 326 regarding various events (e.g., when an item has been acquired by an AGV from a transportation vehicle, when an AGV has arrived at a delivery location with an acquired item, etc.). In various implementations, the remote computing resources 310 and/or central management system 326 may also receive information and/or otherwise communicate with materials handling facilities 330, delivery locations 308 at users' residences, etc. (e.g., regarding activities related to the deliveries of ordered items, etc.).

Figure 4:
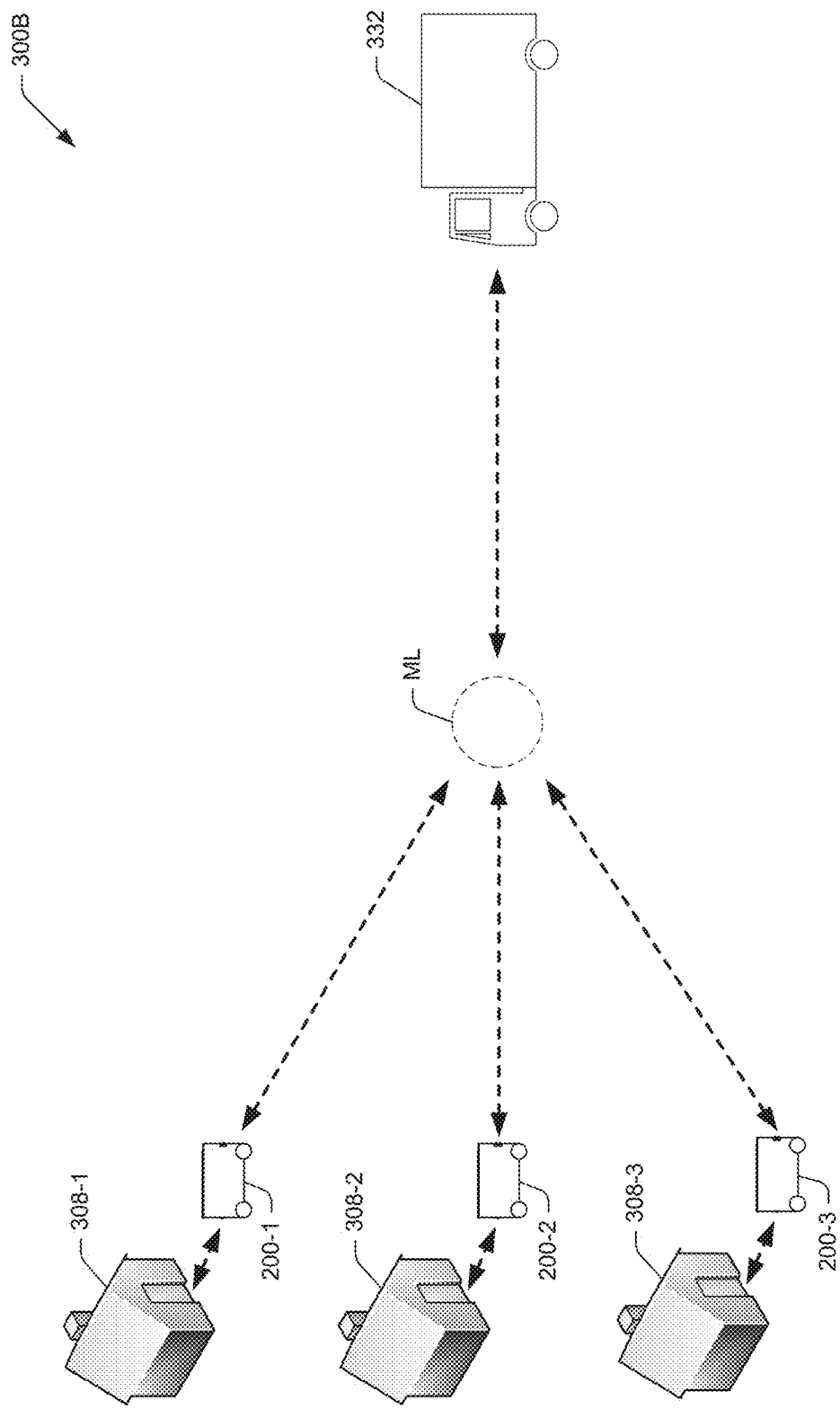
FIG. 4 depicts another block diagram of an autonomous ground vehicle environment, according to some implementations.

FIG. 4 depicts another block diagram of an AGV environment 300B, according to some implementations. In the example of FIG. 4, three delivery locations 308-1, 308-2 and 308-3 are illustrated (e.g., corresponding to user residences, etc.), which may also correspond to home base locations for three AGVs 200-1, 200-2 and 200-3. In one example scenario, a transportation vehicle 332 travels (e.g., from a materials handling facility) with items to a meeting location ML. The AGVs 200-1, 200-2 and 200-3 may travel from respective home base locations (e.g., corresponding to the respective delivery locations 308-1, 308-2 and 308-3 at the respective user residences) to the meeting location ML. At the meeting location ML, the AGVs 200-1, 200-2 and 200-3 acquire respective items from the transportation vehicle 332, and follow respective travel paths back to the respective delivery locations 308-1, 308-2 and 308-3.

In various implementations, the meeting location ML that the transportation vehicle 332 is travelling to for meeting the AGVs 200-1, 200-2 and 200-3 may be determined in various ways. For example, the meeting location ML may be determined according to a notification that is received from a central management system 326 or remote computing resource that indicates the meeting location. As another example, the transportation vehicle 332 may follow a scheduled delivery route for which the meeting location ML may be determined according to a scheduled stopping location of the transportation vehicle 332 at a particular time. As another example, coordination may be performed with the transportation vehicle 332 to determine the meeting location ML. In various implementations, once the meeting location ML is determined, the AGVs 200-1, 200-2 and 200-3 may each receive messages or otherwise be instructed to receive one or more items from the transportation vehicle 332 at the meeting location ML, wherein the items are to be delivered by the AGVs from the meeting location ML to the respective delivery locations 308-1, 308-2 and 308-3 at the respective user residences.

Such messages or instructions may indicate a time when the transportation vehicle 332 is expected to arrive at the meeting location 332. The AGVs 200-1, 200-2 and 200-3 may begin travel toward the meeting location ML far enough in advance so as to arrive before or at the same time as the transportation vehicle 332. In various implementations, the AGVs 200-1, 200-2 and 200-3 may congregate in specified patterns or arrangements at the meeting location ML. For example, the AGVs 200-1, 200-2 and 200-3 may line up at the meeting location ML in a particular order (e.g., according to the addresses of the delivery locations 308-1, 308-2 and 308-3, or in other orders) so as to simplify the transfer of items from the transportation vehicle 332 to the AGVs 200-1, 200-2 and 200-3. The AGVs 200-1, 200-2 and 200-3 may also include markings or other identifying symbols or devices (e.g., lights, sounds, etc.) for simplifying the identification and transfer of corresponding items from the transportation vehicle 332 to the AGVs.

As will be described in more detail below with respect to FIGS. 7 and 8, as part of the travel from the home base locations to the meeting location, and from the meeting location to the delivery locations (e.g., which may be the same as the home base locations), the AGVs 200-1, 200-2 and 200-3 may encounter various obstacles and/or access barriers (e.g., doors, gates, etc.) The AGVs 200-1, 200-2 and 200-3 may be enabled with navigation capabilities for navigating around obstacles and for opening or otherwise gaining access past access barriers (e.g., to allow an AGV to bring an item into a user's residence as instructed by the user). In various implementations, additional navigation may also be required when a home base location is not the same as a delivery location. For example, a home base location may be on the front porch of a user's residence, and once an item is acquired, a user may want the AGV to bring the item to a delivery location inside the user's residence (e.g., requiring navigation through a door or other access point of the user's residence). Once the item has been delivered from the AGV (e.g., as retrieved by the user from the AGV, or as otherwise removed from the AGV by a robotic arm of the AGV or residence, etc.), the AGV may be instructed to return to the home base location (e.g., requiring navigation back out a door or other access point of the user's residence so as to return to the front porch, etc.). In various implementations, the AGV may be configured to transmit a signal, or otherwise include an identification mechanism to cause the access barrier (e.g., a door, etc.) to be opened or otherwise unlocked to allow the AGV to navigate through or otherwise past the access barrier.

In a different example scenario, rather than the AGVs 200-2 and 200-3 both being utilized to deliver the ordered items to the delivery locations 308-2 and 308-3, a single AGV (e.g., AGV 200-2) may include two or more storage compartments (e.g., see FIG. 2B) and may be utilized to deliver the items. In such a scenario, the AGV 200-2 may travel to the meeting location ML and may receive items that are placed in the first and second storage compartments, according to the different user orders. The AGV 200-2 may then deliver the items to the delivery locations 308-2 and 308-3, wherein at the delivery location 308-2 only the first storage compartment may be opened, and at the delivery location 308-3 only the second storage compartment may be opened. In such a configuration where an AGV has multiple storage compartments for delivering multiple orders, a separate access code or other mechanism may be utilized for each of the storage compartments, so that each user may only access or otherwise receive the item(s) that are part of their order.

Figure 5:
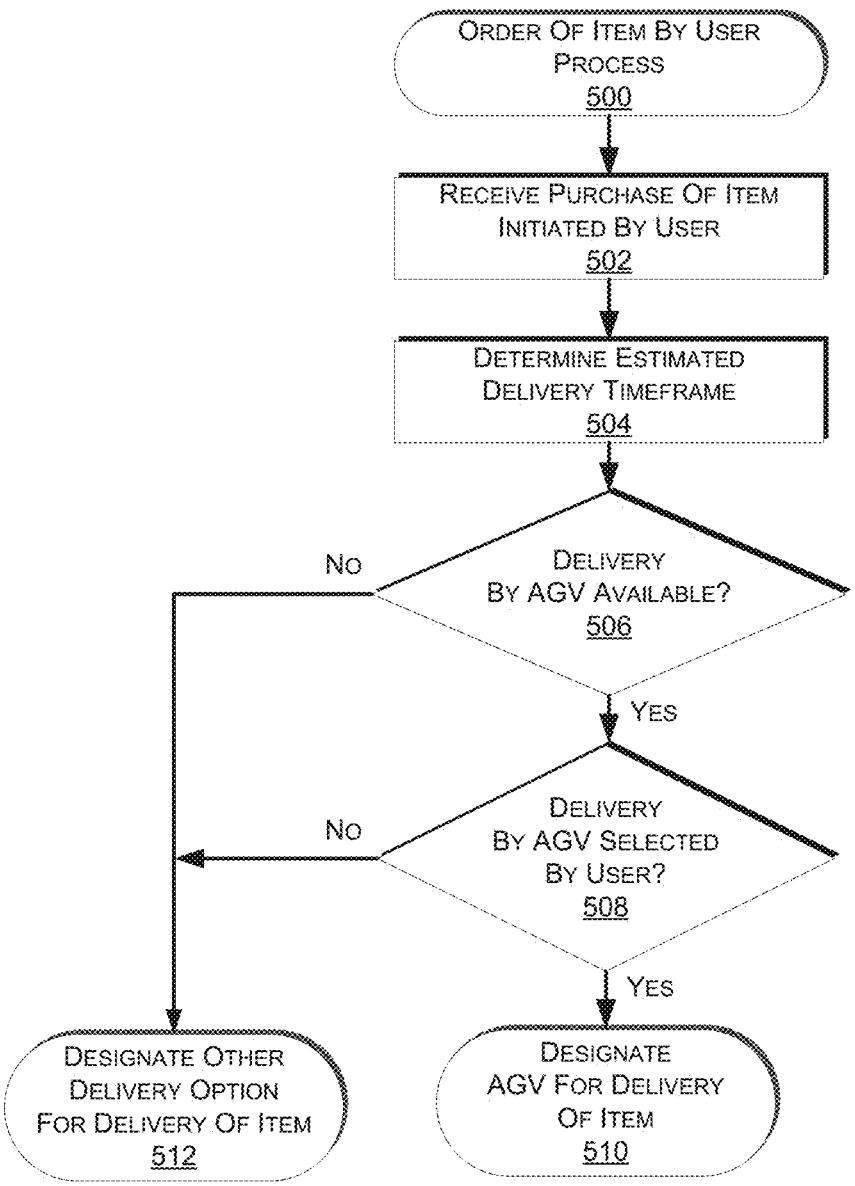
FIG. 5 is a flow diagram illustrating an example process for processing a user order for an item, according to some implementations.

FIG. 5 is a flow diagram illustrating an example process 500 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins with the receipt of a purchase request initiated by a user, as in 502. Upon receiving a purchase request for an item from a user, a determination is made as to the estimated delivery timeframe for that item, as in 504. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

After the estimated delivery timeframe is determined, a determination is made as to whether a delivery by an AGV is available, as in 506. As described above, in various implementations, AGVs may be stationed at home base locations that correspond to delivery locations (e.g., at user residences). For example, if a user owns or otherwise has an AGV stationed at a home base location at the user's residence, and if a delivery vehicle is available that can travel to a meeting location and transfer the item to the AGV for the delivery, then delivery by the AGV may be determined to be available. If it is determined that a delivery by an AGV is available, a determination is made as to whether a delivery by AGV is selected by the user, as in 508. In various implementations, an interaction may be received from a user through a user interface that presents delivery options to the user and receives a selection from the user (e.g., for selecting a delivery by AGV or other delivery option). In addition, in various implementations a user may preselect or provide a preference for deliveries by an AGV or other delivery options. If a delivery by AGV is selected by the user, the delivery by AGV is designated as the delivery option for the item, as in 510.

If it is determined that a delivery by AGV is not selected by the user, as in 508, or if delivery by AGV is not available, as in 506, another type of delivery option is designated (e.g., as selected by the user) for the item, as in 512. In various implementations, other delivery options may include traditional carrier deliveries, providing an item at a pickup location where a user may retrieve the item, etc.

Figure 6:
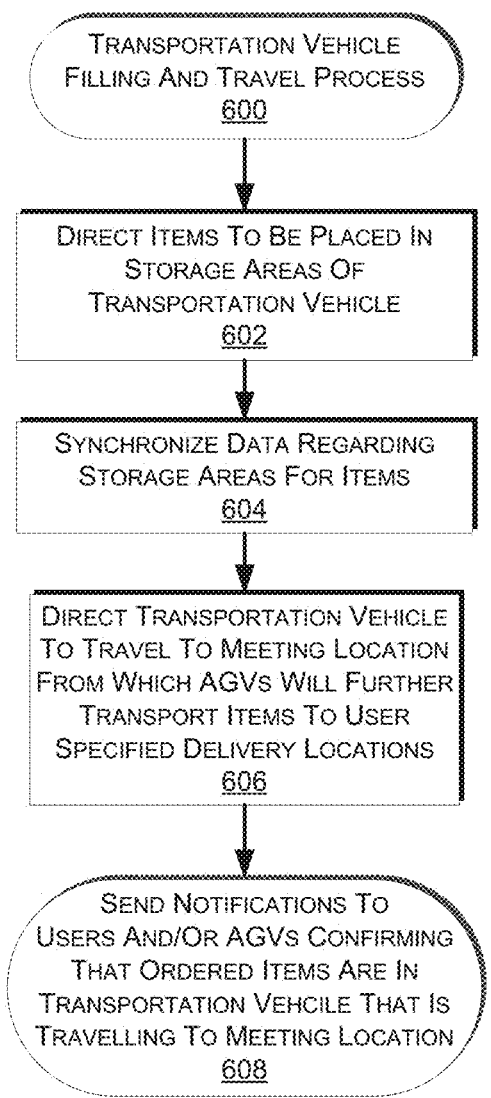
FIG. 6 is a flow diagram illustrating an example process for filling a transportation vehicle and travelling to a meeting location where autonomous ground vehicles will be met, according to some implementations.

FIG. 6 is a flow diagram illustrating an example process 600 for filling a transportation vehicle with items for delivery and travelling to a meeting location. The example process begins by directing items to be placed into storage areas of the transportation vehicle, as in 602. For example, as described above with respect to FIG. 1, for items that have been ordered with AGVs designated for the deliveries, in one implementation a materials handling facility may pick and place the ordered items in one or more storage areas (e.g., bins) of the transportation vehicle from which the items will be transferred to the designated AGVs. As another example, in addition or as an alternative to receiving items at a materials handling facility, the transportation vehicle may also travel to a receiving area or location for receiving items (e.g., from a merchant, vendor, etc.) before travelling to a meeting location where items will be transferred to AGVs.

After the items have been placed into the storage areas of the transportation vehicle, data may be synchronized regarding the storage areas, as in 604. In various implementations, at least some of the data that is synchronized may be generated as the items are placed into the storage areas of the transportation vehicle. For example, as described above with respect to FIG. 1, the transportation vehicle and/or individual storage areas (e.g., bins) may include unique identifiers, such as a bar code, QR code, unique number, etc., to enable tracking, identification and association of items placed into the storage areas of the transportation vehicle. Scanning of the identifiers for the storage areas and the picked items may result in the items becoming associated with the storage areas and tracked with the transportation vehicle. In various implementations, the associated data may be synchronized among a computing system of the transportation vehicle, the central management system, and/or other systems.

After the data has been synchronized, the transportation vehicle is directed to travel to a meeting location where the items will be transferred to AGVs for further transport to user specified delivery locations, as in 606. In various implementations, the transportation vehicle may be any type of mobile machine, such as a truck, car, watercraft, aircraft, etc., and control of the mobile machine may be manual (e.g., a driver) or automated (e.g., directly or remotely controlled by an automated system, robotic, etc.). As will be described in more detail below with respect to FIG. 7, AGVs may begin travel toward the meeting location so as to arrive before or at the same time as the transportation vehicle.

Once the transportation vehicle is in transit or has reached the meeting location, notifications may be sent to users and/or AGVs confirming that ordered items are in the transportation vehicle, as in 608. For example, a user may wish to receive a confirmation that an ordered item is in the transportation vehicle. Such notifications may also be utilized to determine if an AGV should continue travel toward a meeting location (e.g., depending on whether or not the transportation vehicle is transporting the ordered item that the AGV is supposed to receive). In various implementations, such notifications may further indicate an estimated arrival time of the transportation vehicle at the meeting location and/or of the AGV at the user specified delivery location. For example, GPS signals may be utilized to determine the coordinates of the transportation vehicle and/or AGV. In various implementations, users may be able to view a map on a website that shows and updates the current location of the transportation vehicle and/or AGV, or may otherwise receive notifications regarding current locations.

Figure 7:
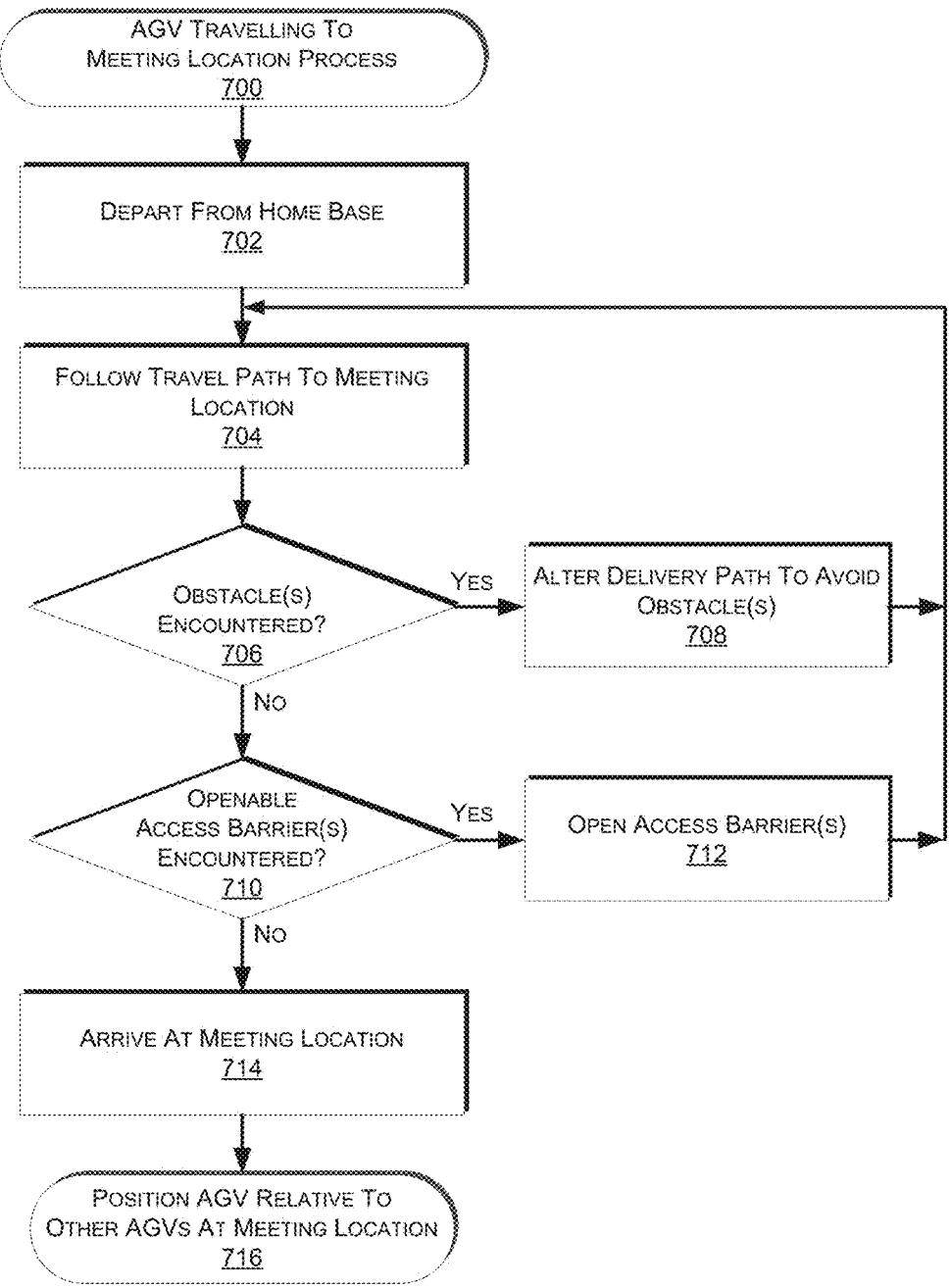
FIG. 7 is a flow diagram illustrating an example process for an autonomous ground vehicle travelling to a meeting location to receive an item from a transportation vehicle, according to some implementations.

FIG. 7 is a flow diagram illustrating an example process 700 for an AGV travelling to a meeting location to receive an item from a transportation vehicle. The example process begins with the AGV departing from a home base location, as in 702. For example, the home base location may be a location inside a user's residence, on a user's porch, in a user's garage, etc. where the AGV is generally stationed and waits for instructions (e.g., while utilizing charging components and/or other facilities). After the AGV departs from the home base location, a travel path is followed to a meeting location, as in 704. In various implementations, travel path instructions and/or information may be received by the AGV (e.g., from the central management system, from a transportation vehicle, from a remote computing resource, from other AGVs, etc.). As part of the travelling along the travel path, the propulsion system of the AGV may be controlled (e.g., by the AGV control system 210 as will be described in more detail below with respect to FIG. 9) to navigate the AGV along the travel path from the home base location where the AGV is stationed to the meeting location (e.g., which may be designated as a receiving location where the AGV receives the item from the transportation vehicle).

In various implementations, the meeting location that the transportation vehicle is travelling to for meeting the AGV (e.g., and possibly other AGVs) may be determined in various ways. For example, the meeting location may be determined according to a notification that is received from a central management system or remote computing resource that indicates the meeting location. As another example, the transportation vehicle may follow a scheduled delivery route for which the meeting location may be determined according to a scheduled stopping location of the transportation vehicle at a particular time. As another example, coordination may be performed with the transportation vehicle to determine a meeting location. In various implementations, once the meeting location is determined, the AGV may be instructed (e.g., by the central management system, a remote computing resource, a control system of the AGV, etc.) to travel from the home base location to the meeting location to meet the transportation vehicle to receive the item.

As the travel path toward the meeting location is followed by the AGV, a determination is made as to whether any obstacles are encountered, as in 706. If obstacles are encountered, the travel path to the meeting location may be altered to avoid the obstacles, as in 708. For example, AGVs that follow roadways, sidewalks, etc. may encounter obstacles (e.g., construction, blocked pathways, etc.) for which a different route may be calculated and taken. In addition to the travel path being altered to avoid any obstacles, a determination is also made as to whether any openable access barriers (e.g., openable doors, gates, etc.) are encountered, as in 710. If openable access barriers are encountered, the access barriers are opened to allow the AGV to travel through the access barriers, as in 712.

In various implementations, the AGV may include an access mechanism that is configured to transmit a signal, or otherwise to cause an access barrier to be opened or otherwise unlocked to allow the AGV to travel through or otherwise past the access barrier. For example, the AGV may include an access mechanism that is configured to transmit a remote control signal to open an access barrier (e.g., a garage door) so as to allow the AGV to leave the garage to travel to a meeting location. As another example, an access barrier in a user's residence that is sized specifically for the AGV may include a sensing mechanism that senses an access mechanism of the AGV for unlocking the access barrier and allowing the AGV to pass through for travelling out to a meeting location. It is noted that if an access barrier is not openable, it may be treated as an obstacle according to the operations of blocks 706 and 708.

In various implementations, an AGV may also utilize various types of assistance (e.g., from a human, another AGV, another autonomous mechanism, etc.) as part of the navigation along a travel path (e.g., in order to navigate past an obstacle or access barrier, etc.). In various implementations, an AGV may utilize different mechanisms for requesting assistance. For example, an AGV may request assistance by utilizing a speaker (e.g., with a synthesized voice to request that a doorman open a door, etc.), or a display or transmitted electronic message (e.g., with a request for assistance) in order to navigate past obstacles and/or access barriers, etc. In various implementations, a travel path may be determined in part based on an availability of assistance at certain locations. For example, if it is determined that an elevator operator is available to provide assistance (e.g., for pressing a button or otherwise electronically selecting a particular floor on behalf of the AGV, etc.), a travel path may be planned that includes travel by the elevator.

As obstacles and/or access barriers are passed, the AGV continues to travel along the travel path, as in 704, and if additional obstacles and/or access barriers are encountered, the process is repeated, as in 706 and/or 710. Once the AGV has passed any remaining obstacles and/or access barriers as it continues to travel along the travel path, the AGV arrives at the meeting location, as in 714. In various implementations, a notification may be sent (e.g., to the transportation vehicle, central management system, etc.) once the AGV arrives at the meeting location.

After the AGV arrives at the meeting location, the AGV is positioned relative to other AGVs at the meeting location, as in 716. In various implementations, when a group of AGVs is congregating at a meeting location for meeting a transportation vehicle, the positions of the AGVs may be coordinated so that the AGVs are in a designated order at the meeting location. For example, when an AGV is at a meeting location, if other AGVs are determined to be present (e.g., utilizing various sensors of the AGVs and/or as indicated by a central management system, etc.), the AGVs may be instructed to move relative to one another according to a designated order. In various implementations, the designated order may be determined according to various organizational methods. For example, the AGVs may be arranged to be lined up in an order according to the delivery addresses where the AGVs will be delivering items. As another example, the AGVs may be arranged in an order according to an arranged order of items that are stored in a transportation vehicle. In various implementations, the AGVs may also include markings or other identifying symbols or devices (e.g., flashing lights, sounds, etc.) for simplifying the identification and transfer of corresponding items from the transportation vehicle.

Figure 8:
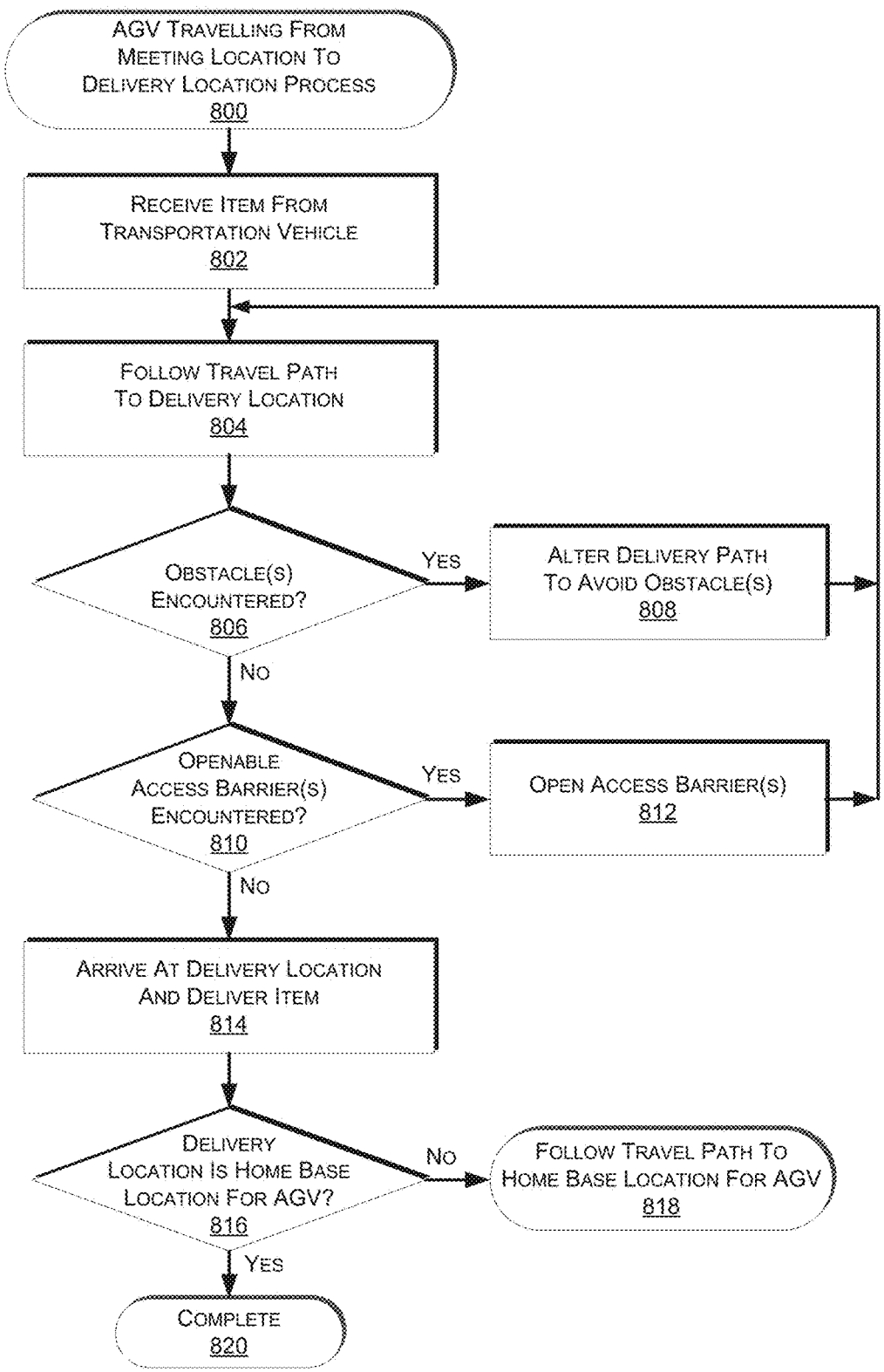
FIG. 8 is a flow diagram illustrating an example process for an autonomous ground vehicle travelling from a meeting location to a delivery location to deliver an item, according to some implementations.

FIG. 8 is a flow diagram illustrating an example process 800 for an AGV travelling from a meeting location to a delivery location to deliver an item. The example process begins with the AGV receiving the item from the transportation vehicle, as in 802. In various implementations, different types of techniques may be utilized for the AGV to receive the item. For example, an AGV and/or transportation vehicle may include an item engagement mechanism (e.g., a robotic arm) for engaging an item that is on the transportation vehicle that is to be received by the AGV (e.g., by placing the item in a storage compartment of the AGV, etc.). As another example, a human carrier who is operating the transportation vehicle may take the item from the transportation vehicle and place it in a storage compartment of the AGV.

In various implementations, once the item is placed in the storage compartment, the storage compartment may be locked or otherwise secured for the transport of the item to a delivery location. For example, the storage compartment may include an electronic locking mechanism that may be controlled to lock the storage compartment once it is determined that the item has been placed in the storage compartment. The determination that an item has been placed in the storage compartment may be made according to various types of procedures. For example, an input may be received (e.g., by the AGV control system 210) from a carrier, transportation vehicle, remote computing resource, etc. that indicates that an item has been placed in the storage compartment that is to be delivered to a delivery location. As another example, various sensors (e.g., sensors 271-273) may be utilized to determine that an item has been placed in the storage compartment and has thus been received by the AGV. In various implementations, once the item is received, or in some instances before the item is received, the AGV may be instructed (e.g., by the central management system, a remote computing resource, a control system 210 of the AGV, etc.) to travel from the meeting location to a delivery location (e.g., at a user's residence) to deliver the item. In various implementations, once the item is received, a message may also be sent to the user (e.g., from the AGV control system 210, the central management system, a remote computing resource, etc.) that indicates that the AGV has received the item and the message may also indicate an identification of the item (e.g., including a description or picture of the item taken by a sensor of the AGV, etc.).

After the item is received, the AGV follows a travel path to a delivery location, as in 804. In various implementations, travel path instructions and/or information may be received by the AGV (e.g., from the central management system, from a transportation vehicle, from a remote computing resource, from other AGVs, etc.). As part of the travelling along the travel path, the propulsion system of the AGV may be controlled (e.g., by the AGV control system 210 as will be described in more detail below with respect to FIG. 9) to navigate the AGV along the travel path to the delivery location to deliver the item. As the travel path is followed, a determination is made as to whether any obstacles are encountered, as in 806. If obstacles are encountered, the travel path to the meeting location may be altered to avoid the obstacles, as in 808, similar to the operations described above with respect to block 708 of FIG. 7. In addition to the travel path being altered to avoid any obstacles, a determination is also made as to whether any openable access barriers (e.g., openable doors, gates, etc.) are encountered, as in 810. If openable access barriers are encountered, the access barriers are opened to allow the AGV to travel through the access barriers, as in 812, similar to the operations described above with respect to block 808 of FIG. 8.

As obstacles and/or access barriers are passed, the AGV continues to travel along the travel path, as in 804, and if additional obstacles and/or access barriers are encountered, the process is repeated, as in 806 and/or 810. Once the AGV has passed any remaining obstacles and/or access barriers as it continues to travel along the travel path, the AGV arrives at the delivery location and delivers the item, as in 814. In various implementations, a notification may be sent (e.g., to the central management system, to a user, etc.) once the AGV arrives at the delivery location and/or otherwise has received and/or delivered the item. In various implementations, a notification may be included as part of a message that is sent to a user (e.g., from the AGV, central management system, etc.), which indicates that an item is being delivered and may also include information indicating an identification of the item (e.g., a description of the item, a picture of the item in the storage compartment as taken by an image capture sensor of the AGV, etc.).

In various implementations, the delivery of the item at the delivery location may be performed by following various procedures. For example, an item engagement mechanism (e.g., a robotic arm) of the AGV or delivery location may be utilized to remove the item from the storage compartment of the AGV and place the item at the delivery location (e.g., in a corner of the floor, on a counter, in a refrigerator, etc.). As another example, a delivery may consist of the AGV waiting at the delivery location until a user arrives and removes the item from the storage compartment of the AGV. In some instances, a user may be required to perform an action to unlock or otherwise open the storage compartment (e.g., by interacting with the user interface 211 and entering an access code, or sending a signal from a smart phone, or utilizing another electronic or mechanical opening device, etc.) In response to such unlocking procedures, the locking mechanism is controlled (e.g., by the AGV control system 210, central management system, remote computing resource, etc.) to unlock the storage compartment to enable the item to be retrieved from the storage compartment at the delivery location by the user. In other instances, the locking mechanism may be controlled to automatically unlock the storage compartment once an AGV reaches a delivery location (e.g., according to a sensed location of the AGV, or according to a signal from a transmitting device within a user's residence or doorway, etc.).

After the item is delivered, a determination is made as to whether the delivery location is a home base location for the AGV. If the delivery location is not a home base location, the AGV follows a travel path to a home base location, as in 818. If the delivery location is a home base location for the AGV, the process completes, as in 820. In various implementations, a home base location for an AGV may include charging components or other facilities for the AGV (e.g., an inductive charging component that the AGV engages when the AGV is at the home base location, etc.). In various implementations, a home base location may be a location where an AGV is generally stationed and waits for instructions and/or is otherwise located when not performing deliveries or other activities, and to which an AGV may return when such activities are completed.

In various implementations, a home base location for an AGV may be in or around different areas of a user's residence or other location. For example, a home base location may be in a user's kitchen, hallway, garage, front porch, etc. As other examples, a home base location for an AGV that services a group of users may be in a common area such as a hallway, lobby, garage, etc. As noted above, in some instances a home base location may be utilized as a delivery location where an item will be retrieved from a storage compartment of the AGV by a user. In other instances, the delivery location may be in a more convenient area or location (e.g., as delivered to a user's front door, kitchen, etc.), after which the AGV may return to a home base location. In various implementations, the AGV may return to a different home base location than the AGV started at for making a current delivery. For example, a residence or other area may include multiple home base locations, where an AGV may return to whichever home base location is most convenient or optimal for future expected deliveries, etc.

In various implementations, a home base location may also be a meeting location that a transportation vehicle may travel to where items are to be received by AGVs. For example, an apartment building may have a home base location in a garage, wherein one or more AGVs may be stationed at the home base location to wait for a transportation vehicle that will enter the garage for transferring items to the AGVs. In such instances, an AGV may not need to travel to the meeting location (e.g., as described above with respect to FIG. 7), since the home base location where the AGV is stationed is the same as the meeting location that the transportation vehicle travels to. Once the items are received, the AGVs may follow travel paths (e.g., utilizing an elevator of the building) to travel to the designated delivery locations (e.g., at users' front doors on the various floors of the building, etc.).

In various implementations, certain portions of the example process 800 may be repeated, in particular with regard to deliveries of multiple items. For example, if an AGV is carrying multiple items that are to be delivered to different delivery locations (e.g., as stored in separate storage compartments of the AGV), the AGV may travel from one delivery location to another before returning to a home base location or other designated location. As another example, an AGV may receive multiple items from different transportation vehicles or other sources (e.g., stored in separate storage compartments of the AGV), before delivering the multiple items to one or more delivery locations. In a configuration where separate storage compartments (e.g., see FIG. 3B) are utilized for separate deliveries, a separate access code or other mechanism may be utilized for opening each of the storage compartments, so that each user may only access or otherwise receive the item(s) that are part of their delivery.

In various implementations, in addition to delivering items to users, AGVs may also be utilized for delivering items to transportation vehicles as part of return processes for items. For example, when user wishes to return an ordered item, the user may place the item in an AGV which may travel to a delivery location which may be a meeting location where the AGV will deliver the item to a transportation vehicle which will transport the item back to a materials handling facility or other location as part of a return process for the item. In such instances, certain portions of the processes described above with respect to FIGS. 7 and 8 may essentially be reversed, wherein after an item that is to be returned is received in a storage compartment of the AGV (e.g., at a user's residence, etc.), the AGV may follow a travel path to a delivery location/meeting location (e.g., where other AGVs that are returning or receiving items may congregate) for meeting a transportation vehicle to which the AGV will deliver the item for the return. After the item has been delivered to the transportation vehicle, the AGV may then follow a travel path back to a home base location.

In various implementations, a receiving location may be designated as a location where an AGV receives an item that is to be transported by the AGV. In the above scenario where an item is received by the AGV as part of a return process for the item (e.g., wherein the AGV is to transport the item to a transportation vehicle for the return), the receiving location may be a home base location that the AGV is stationed at. For example, when a user wishes to return an item, the user may take the item to the home base location where the AGV is stationed and may place the item in the storage compartment of the AGV, in which case the home base location is a receiving location for the AGV. Alternatively, in a scenario where an AGV is delivering an item to a user, the receiving location may be a meeting location that the AGV travels to or is otherwise at for receiving the item from a transportation vehicle (e.g., as described above with respect to FIGS. 7 and 8).

Figure 9:
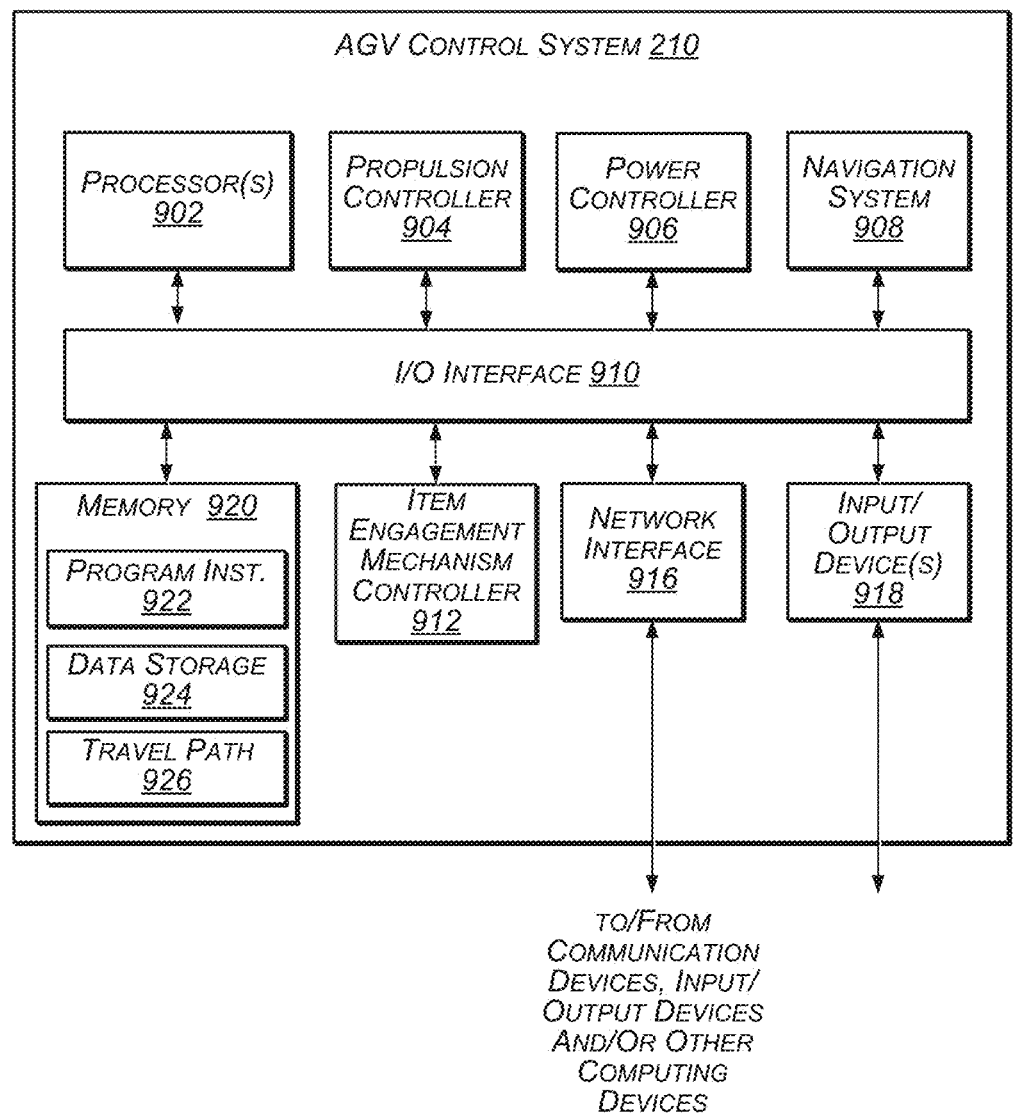
FIG. 9 depicts a block diagram illustrating various components of an autonomous ground vehicle control system, according to an implementation.

FIG. 9 is a block diagram illustrating an example AGV control system 210, such as may be utilized for the AGVs 200 of FIGS. 2A, 2B, 3 and 4, or for other types of AGVs. In various examples, the block diagram of FIG. 9 may be illustrative of one or more aspects of the AGV control system 210 that may be used to implement the various systems and methods discussed herein. In the illustrated implementation, the AGV control system 210 includes one or more processors 902 coupled to a non-transitory computer readable storage medium 920 via an input/output (I/O) interface 910. The AGV control system 210 may also include a propulsion controller 904 (e.g., for controlling one or more motors, engines, etc.), a power controller 906 (e.g., for controlling, monitoring and/or regulating the use and charging of the power modules) and/or a navigation system 908. The AGV control system 210 further includes an item engagement mechanism controller 912, a network interface 916, and one or more input/output devices 918.

In various implementations, the AGV control system 210 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, travel paths, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and travel path data 926, respectively. In other implementations, program instructions, data, and/or travel paths may be received, sent, or stored upon different types of computer-accessible media, such as non-transitory media, or on similar media separate from the non-transitory computer readable storage medium 920 or the AGV control system 210. Generally speaking, a non-transitory, computer readable storage medium may include storage media or memory media such as magnetic or optical media, e.g., disk or CD/DVD-ROM, coupled to the AGV control system 210 via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Additionally, in some implementations, some or all of the functionality of the I/O interface 910, such as an interface to the non-transitory computer readable storage medium 920, may be incorporated directly into the processor(s) 902.

The propulsion controller 904 communicates with the navigation system 908 (e.g., for adjusting the steering and power of the motor of the AGV 200 of FIG. 2 to guide the AGV along a determined travel path). The navigation system 908 may include a global positioning system (GPS), indoor positioning system (IPS), or other similar system and/or sensors that can be used to navigate the AGV 200 to and/or from a location. The item engagement mechanism controller 912 is utilized to engage and/or disengage items that are to be acquired and/or delivered by the AGV 200. For example, the item engagement mechanism controller 912 may operate an item engagement mechanism that includes a robotic arm or other mechanism for engaging items and placing them in a storage compartment of the AGV 200, or for removing items from a storage compartment and placing them at a delivery location or other location. In various configurations, the item engagement mechanism may be powered by the power modules, motors, etc. of the AGV 200.

The network interface 916 may be configured to allow data to be exchanged between the AGV control system 210, other devices attached to a network, such as other computer systems (e.g., remote computing resources 210), and/or with AGV control systems of other AGVs. For example, the network interface 916 may enable wireless communication between the AGV 200 and the central management system 326 that is implemented on one or more of the remote computing resources 210. For wireless communication, an antenna of an AGV or other communication components may be utilized. As another example, the network interface 916 may enable wireless communication between numerous AGVs. In various implementations, the network interface 916 may support communication via wireless general data networks, such as a Wi-Fi network. For example, the network interface 916 may support communication via telecommunications networks such as cellular communication networks, satellite networks, and the like.

In some implementations, with respect to the operations of the user interface 211 and/or operations for accessing the storage compartment(s), receiving items, etc., the input/output devices 918 may include one or more display terminals, keyboards, keypads, touchpads, scanning devices, voice or optical recognition devices, sensors, or any other devices suitable for entering or retrieving data or sensing inputs. Multiple input/output devices 918, some of which may be included as part of the user interface 211, may be present in or otherwise controlled by the AGV control system 210 or may be distributed on various nodes of the AGV control system 210. In some implementations, similar input/output devices may be separate from the AGV control system 210 and may interact with one or more nodes of the AGV control system 210 through a wired or wireless connection, such as over the network interface 916.

In some implementations, with respect to the navigation, etc. of the AGV 200, the input/output devices 918 may include one or more displays, imaging sensors, thermal sensors, infrared sensors, time of travel sensors, accelerometers, weather sensors, locator devices, etc. Multiple such input/output devices 918 may be present and controlled by the AGV control system 210. One or more of these sensors (e.g., imaging sensors, etc.) may be utilized to assist with navigating the AGV 200 along travel paths (e.g., including the avoidance of other vehicles or obstacles during travel, etc.). In various implementations, such sensors may also be utilized for assisting with the positioning of the AGV 200 relative to other AGVs at a meeting location and/or other activities of the AGV 200. For example, an imaging sensor may be utilized to assist with navigation, as well determining an identification of a transportation vehicle from which an item is to be received and/or an identification of an item that is to be received.

As shown in FIG. 9, the memory may include program instructions 922 that may be configured to implement the example processes and/or sub-processes described herein. The data storage 924 may include various data stores for maintaining data items that may be provided for determining travel paths, receiving and delivering items, identifying locations, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AGV control system 210 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AGV control system 210 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AGV control system 210. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the AGV control system 210 may be transmitted to the AGV control system 210 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other AGV control system configurations.

While the functional components of the example AGV 200 are discussed herein as part of the AGV 200, in other implementations, one or more of the functional components may be distributed and/or implemented as part of the central management system 326. For example, one or more of the aspects of the program instructions 922 may be implemented as part of the central management system 326.

Figure 10:
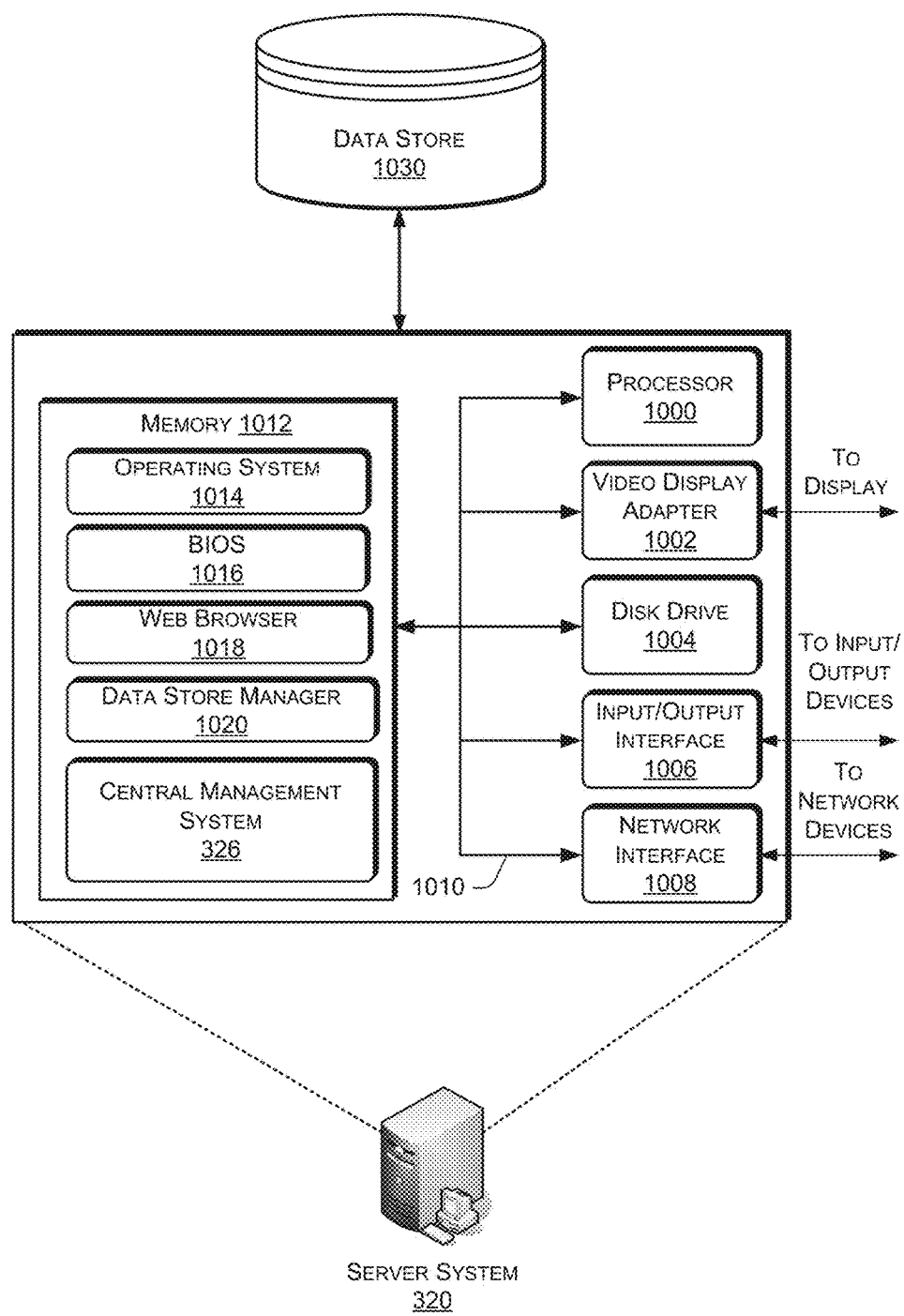
FIG. 10 is a block diagram of an illustrative implementation of a server system that may be used with various implementations.

FIG. 10 is a block diagram of an illustrative implementation of a server system, such as the server system 320, which may be used in the implementations described herein. The server system 320 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an agent of the server system 320 to monitor and configure operation of the server system 320 and/or to provide information (e.g., regarding the operations of AGVs 200, etc.). The input/output interface 1006 likewise communicates with external input/output devices not shown in FIG. 10, such as a mouse, keyboard, scanner, or other input and output devices that can be operated by an agent of the server system 320. The network interface 1008 includes hardware, software, or any combination thereof, to communicate with other computing devices. For example, the network interface 1008 may be configured to provide communications between the server system 320 and other computing devices, such as that of an AGV 200, central management system 326, etc., via a network.

The memory 1012 generally comprises random access memory (RAM), read-only memory (ROM), flash memory, and/or other volatile or permanent memory. The memory 1012 is shown storing an operating system 1014 for controlling the operation of the server system 320. A binary input/output system (BIOS) 1016 for controlling the low-level operation of the server system 320 is also stored in the memory 1012.

The memory 1012 additionally stores program code and data for providing network services to the AGV 200, central management system 326, etc. Accordingly, the memory 1012 may store a browser application 1018. The browser application 1018 comprises computer executable instructions, that, when executed by the processor 1000 generate or otherwise obtain configurable markup documents such as Web pages. The browser application 1018 communicates with a data store manager application 1020 to facilitate data exchange between the data store 1030 and the AGVs 200, the central management system 326, etc.

As used herein, the term "data store" refers to any device or combination of devices capable of storing, accessing, and retrieving data, which may include any combination and number of data servers, databases, data storage devices and data storage media, in any standard, distributed or clustered environment. The server system 320 can include any appropriate hardware and software for integrating with the data store 1030 as needed to execute aspects of one or more applications for an AGV 200, central management system 326, etc.

The data store 1030 can include several separate data tables, databases or other data storage mechanisms and media for storing data relating to a particular aspect. For example, the illustrated data store 1030 may include mechanisms for maintaining information related to operations, inventory, maps, GPS data, AGVs, delivery locations, home base locations, meeting locations, associated travel paths, etc., which can be used to generate and deliver information to an AGV 200, central management system 326, agents, etc. It should be understood that there may be additional aspects that can be stored in the data store 1030 and that additional data stores beyond the one illustrated may be included. The data store 1030 is operable, through logic associated therewith, to receive instructions from the server system 320 and obtain, update or otherwise process data in response thereto.

The memory 1012 may also include the central management system 326, discussed above. The central management system 326 may be executable by the processor 1000 to implement one or more of the functions of the server system 320. In one implementation, the central management system 326 may represent instructions embodied in one or more software programs stored in the memory 1012. In another implementation, the central management system 326 can represent hardware, software instructions, or a combination thereof.

The server system 320, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to transport an ordered item, the system comprising:
   a first autonomous ground vehicle (AGV) that is stationed at a first home base location at a first user's residence; and
   a computing system comprising:
      one or more processors; and
      a memory coupled to the one or more processors and storing program instructions that when executed by the one or more processors cause the one or more processors to at least:
         determine a meeting location which the first AGV will travel to for meeting a transportation vehicle;
         receive a notification that indicates an estimated time of when the transportation vehicle is expected to arrive at the meeting location;
         instruct the first AGV to travel from the first home base location to the meeting location to meet the transportation vehicle;
         determine that a first item from the transportation vehicle has been placed in a storage compartment of the first AGV while the first AGV is at the meeting location; and
         instruct the first AGV to travel from the meeting location to the first user's residence to deliver the first item.

2. The system of claim 1, wherein the memory further includes program instructions that when executed by the one or more processors cause the one or more processors to at least determine a starting travel time when the first AGV is to begin travelling to the meeting location based at least in part on the estimated time of when the transportation vehicle is expected to arrive at the meeting location.

3. The system of claim 2, wherein the starting travel time is determined to enable the first AGV to arrive at the meeting location ahead of the transportation vehicle.

4. An autonomous ground vehicle (AGV) comprising:
   a propulsion system;
   a storage compartment having a locking mechanism; and
   a computing system, comprising:
      one or more processors; and
      a memory coupled to the one or more processors and storing program instructions that when executed by the one or more processors cause the one or more processors to at least:
         receive a notification that indicates an estimated time of when a transportation vehicle is expected to arrive at a meeting location;
         control the propulsion system to navigate the AGV to the meeting location to meet the transportation vehicle;
         determine that an item from the transportation vehicle has been placed in the storage compartment while the AGV is at the meeting location;
         control the locking mechanism to lock the storage compartment of the AGV after it has been determined that the item from the transportation vehicle has been placed in the storage compartment;
         control the propulsion system to navigate the AGV along a travel path from the meeting location to a delivery location to deliver the item; and
         control the locking mechanism to unlock the storage compartment at the delivery location to enable the item to be retrieved from the storage compartment at the delivery location.

5. The AGV of claim 4, wherein the delivery location is at a user's residence.

6. The AGV of claim 4, further comprising an access mechanism that is utilized to open an access barrier that the AGV encounters along the travel path to the delivery location.

7. The AGV of claim 4, further comprising an item engagement mechanism that is utilized to place the item from the transportation vehicle into the storage compartment of the AGV at the meeting location.

8. The AGV of claim 4, further comprising at least one of:
   a presence detection sensor that detects the presence of the item that has been placed in the storage compartment;
   a motion sensor that detects movement when the item is placed in the storage compartment;
   an image capture sensor that captures an image of the item that has been placed in the storage compartment;
   an item identification sensor that is utilized to determine an identification of the item that has been placed in the storage compartment; or
   a temperature sensor that senses a temperature in the storage compartment.

9. A computer implemented method for transporting items, the computer implemented method comprising:

under control of one or more computing systems configured with executable instructions,
determining a meeting location to which first and second autonomous ground vehicles (AGVs) will travel to meet a transportation vehicle;
receiving a notification that indicates an estimated time of when the transportation vehicle is expected to arrive at the meeting location;
instructing the first AGV to travel to the meeting location;
instructing the second AGV to travel to the meeting location;
instructing the first AGV to receive a first item from the transportation vehicle at the meeting location;
instructing the first AGV to travel from the meeting location to a first delivery location to deliver the first item;
instructing the second AGV to receive a second item from the transportation vehicle at the meeting location; and
instructing the second AGV to travel from the meeting location to a second delivery location to deliver the second item.

10. The computer implemented method of claim 9, wherein the first and second delivery locations are at respective first and second user's residences.

11. The computer implemented method of claim 9, further comprising instructing the second AGV to receive a third item from the transportation vehicle at the meeting location and to travel from the meeting location to a third delivery location to deliver the third item, wherein the second AGV includes separate storage compartments in which the second and third items are received.

12. The computer implemented method of claim 9, wherein the first and second AGVs travel from respective first and second home base locations at respective first and second user's residences to the meeting location.

13. The computer implemented method of claim 9, wherein the meeting location is a home base location for the first and second AGVs.

14. The system of claim 1, wherein the notification that is received which indicates an estimated time of arrival of the transportation vehicle also indicates a current location of the transportation vehicle along a delivery route which the transportation vehicle follows and which includes a stopping location for the transportation vehicle that corresponds to the meeting location.

15. The AGV of claim 4, wherein a starting travel time for starting to control the propulsion system to navigate the AGV to the meeting location is determined based at least in part on the estimated time of when the transportation vehicle is expected to arrive at the meeting location.

16. The AGV of claim 15, wherein the starting travel time is determined to enable the first AGV to arrive at the meeting location ahead of the transportation vehicle.

17. The AGV of claim 4, wherein the notification that is received which indicates an estimated time of arrival of the transportation vehicle also indicates a current location of the transportation vehicle along a delivery route which the transportation vehicle follows and which includes a stopping location for the transportation vehicle that corresponds to the meeting location.

18. The computer implemented method of claim 9, further comprising determining a starting travel time when the AGV is to begin travelling to the meeting location based at least in part on the estimated time of when the transportation vehicle is expected to arrive at the meeting location.

19. The computer implemented method of claim 15, wherein the starting travel time is determined to enable the first AGV to arrive at the meeting location ahead of the transportation vehicle.

20. The computer implemented method of claim 9, wherein the notification that is received which indicates an estimated time of arrival of the transportation vehicle also indicates a current location of the transportation vehicle along a delivery route which the transportation vehicle follows and which includes a stopping location for the transportation vehicle that corresponds to the meeting location.

* * * * *